Aug. 2, 1955 H. P. BOSWAU 2,714,628

AUTOMATIC TELEPHONE SYSTEM

Filed June 25, 1952 13 Sheets-Sheet 1

INVENTOR.
Hans P. Boswau.
BY
[signature]
Atty.

AUTOMATIC TELEPHONE SYSTEM

Filed June 25, 1952 13 Sheets-Sheet 2

Fig. 2.

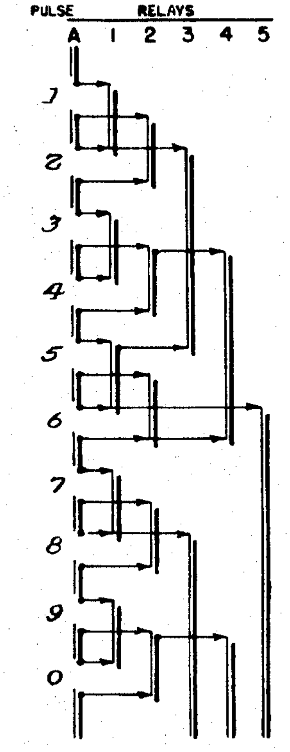

Fig. 3.

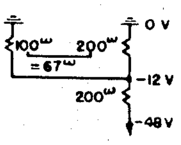

Fig. 4.

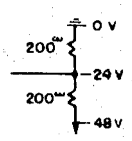

Fig. 5.

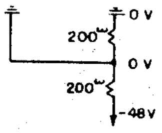

Fig. 6.

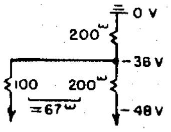

Fig. 7.

| PULSE | COUNTING RELAYS OPERATED | | | | | | LEAD P1 CONNECTED TO | | OPERATING RELAYS | LEAD P2 CONNECTED TO | | OPERATING RELAYS |
|---|---|---|---|---|---|---|---|---|---|---|---|---|
| | DURING PULSE | | | AFTER PULSE | | | | | | | | |
| 1 | 1 | | | 1 2 | | | GRD. THRU 100ω | FIG. 3 | N4 N5 N6 | DIRECT GRD. | FIG. 5 | N1 N2 |
| 2 | 2 | 3 | | | 3 | | " | " 3 | N4 N5 N6 | BATT. THRU 100ω | " 6 | N1 N3 |
| 3 | 1 | 3 | | 1 2 | 3 4 | | OPEN | " 4 | N4 N5 N7 | OPEN | " 4 | N2 N3 |
| 4 | 2 | 3 4 | | | 3 4 | | " | " 4 | N4 N5 N7 | BATT. THRU 100ω | " 6 | N1 N3 |
| 5 | 1 | 4 | | 1 2 | 4 | | " | " 4 | N4 N5 N7 | DIRECT GRD | " 5 | N1 N2 |
| 6 | 2 | 4 | 5 | | | 5 | DIRECT GRD | " 5 | N4 N6 N7 | OPEN | " 4 | N2 N3 |
| 7 | 1 | | 5 | 1 2 | | 5 | " | " 5 | N4 N6 N7 | DIRECT GRD | " 5 | N1 N2 |
| 8 | 2 | 3 | 5 | | 3 | 5 | " | " 5 | N4 N6 N7 | BATT. THRU 100ω | " 6 | N1 N3 |
| 9 | 1 | 3 | 5 | 1 2 | 3 4 | 5 | BATT. THRU 100ω | " 6 | N5 N6 N7 | OPEN | " 4 | N2 N3 |
| 0 | 2 | 3 4 | 5 | | 3 4 | 5 | " | " 6 | N5. N6 N7 | BATT THRU 100ω | " 6 | N1 N3 |

INVENTOR.
Hans P. Boswau.
BY
[signature]
Atty.

Aug. 2, 1955 H. P. BOSWAU 2,714,628

AUTOMATIC TELEPHONE SYSTEM

Filed June 25, 1952 13 Sheets-Sheet 3

INVENTOR.
Hans P. Boswau
BY
[signature]
Atty.

Aug. 2, 1955 H. P. BOSWAU 2,714,628

AUTOMATIC TELEPHONE SYSTEM

Filed June 25, 1952 13 Sheets-Sheet 4

INVENTOR.

Hans P. Boswau.

BY

Atty.

Aug. 2, 1955 H. P. BOSWAU 2,714,628

AUTOMATIC TELEPHONE SYSTEM

Filed June 25, 1952 13 Sheets-Sheet 5

INVENTOR.
Hans P. Boswau.
BY
[signature]
Atty.

Aug. 2, 1955 H. P. BOSWAU 2,714,628

AUTOMATIC TELEPHONE SYSTEM

Filed June 25, 1952 13 Sheets-Sheet 6

INVENTOR.
Hans P. Boswau
BY
, Atty

Aug. 2, 1955 H. P. BOSWAU 2,714,628

AUTOMATIC TELEPHONE SYSTEM

Filed June 25, 1952 13 Sheets-Sheet 7

INVENTOR.
Hans P. Boswau.
BY
Atty.

Aug. 2, 1955 H. P. BOSWAU 2,714,628

AUTOMATIC TELEPHONE SYSTEM

Filed June 25, 1952 13 Sheets-Sheet 8

INVENTOR.
Hans P Boswau.
BY
Atty.

Aug. 2, 1955 H. P. BOSWAU 2,714,628

AUTOMATIC TELEPHONE SYSTEM

Filed June 25, 1952 13 Sheets-Sheet 9

INVENTOR.
Hans P. Boswau
BY
[signature]
Atty

Aug. 2, 1955 H. P. BOSWAU 2,714,628

AUTOMATIC TELEPHONE SYSTEM

Filed June 25, 1952 13 Sheets-Sheet 10

INVENTOR.
Hans P. Boswau.
BY
Atty.

Aug. 2, 1955 H. P. BOSWAU 2,714,628

AUTOMATIC TELEPHONE SYSTEM

Filed June 25, 1952 13 Sheets-Sheet 11

CAX-LINK

TO FIG. 16

INVENTOR.
Hans P. Boswau.
BY
Atty.

Aug. 2, 1955 H. P. BOSWAU 2,714,628

AUTOMATIC TELEPHONE SYSTEM

Filed June 25, 1952 13 Sheets-Sheet 12

FROM FIG. 15. CAX-LINK TO FIG. 17.

INVENTOR.
Hans P Boswau.
BY
Atty.

Aug. 2, 1955 H. P. BOSWAU 2,714,628

AUTOMATIC TELEPHONE SYSTEM

Filed June 25, 1952 13 Sheets-Sheet 13

INVENTOR.
Hans P. Boswau.
BY
[signature]
Atty.

2,714,628
Patented Aug. 2, 1955

2,714,628

AUTOMATIC TELEPHONE SYSTEM

Hans P. Boswau, Dundee, Ill., assignor to Leich Electric Company, a corporation of Illinois Application June 25, 1952, Serial No. 295,401
22 Claims. (Cl. 179—18)

Figure 1:
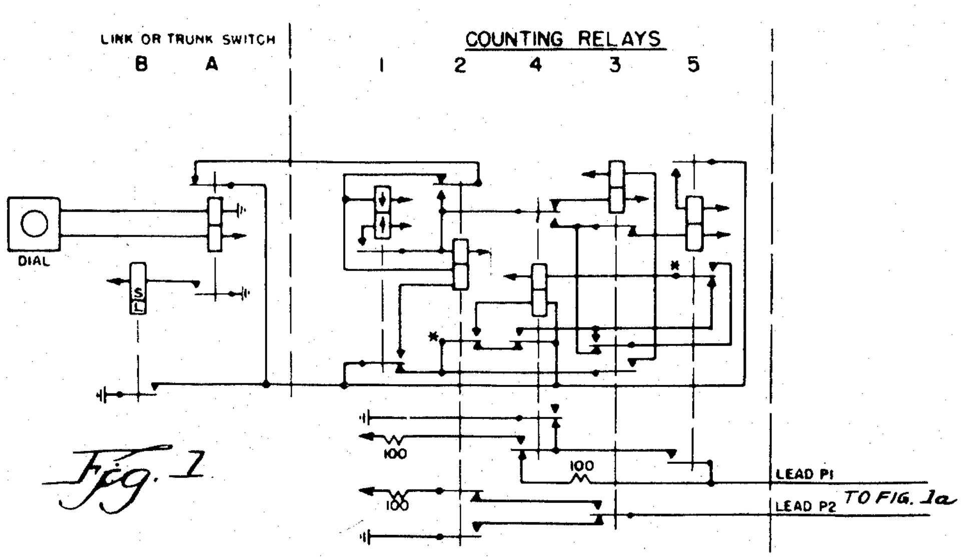

This invention relates to signalling systems, and is particularly concerned with improvements on the automatic telephone system disclosed in copending application Ser. No. 166,624, filed June 7, 1950, as a division of application Ser. No. 65,218 (now Patent No. 2,573,889, issued November 6, 1951).

The system combines certain advantages of crossbar or coordinate type systems and also of relay systems, and the corresponding designations may therefore be interchangeably applied. For the sake of convenience and simplicity, the system will be generally referred to as a "relay system."

The switching mechanism used in the system comprises relay switches of the type disclosed in the above noted Patent No. 2,573,889. These switches may be used as finders, as connectors and also as selectors. As described in the above noted copending application, the switches are in a 100-line system disposed side by side and function as finders and connectors, respectively. The bank multiple is formed by bare conductor bars which extend through all switches in a group. The conductor bars thus form in a 100-line board a line bank multiple having sets of line bars, e. g., one hundred sets of three bars each, which are respectively connected with the individual line equipment of the corresponding one hundred subscribers, each switch having access to the associated sets of line bars. Each switch has ten tens magnets and ten units magnets, and tens and units actuators respectively operated thereby. Each switch also has a separate bank of conductor bars, which is the allotter bank, and an allotter actuator which is operated by an allotter magnet. Connections between subscribers are in each case accomplished by the operation of the allotter actuator to cause operation of the proper tens and units magnets. The selection operations are controlled by tens and units guard circuits, marker circuits and link circuits. The tens and units guard circuits designate the calling lines in the allotter bank. The marker cooperates with the link in establishing connections. Details may be had by consulting the previously mentioned copending application.

The object of the invention is to provide a switchboard which can be used to serve equally well as a separate 100-line board or as a 100-line unit in a selector type board, and which can be easily expanded in the field from a 100-line board to a selector board. This object is accomplished by using the same link circuit in both types of boards and by providing in the switchboard bay mounting space for the additional apparatus needed for a selector system.

The realization of this object needed a novel approach so as to avoid undue increase in the size of the switchboard bay. In conventional systems, selectors are inserted ahead of the transmission and control circuits which are part of the connectors. If such conventional practice were followed in a relay system of the disclosed type, this would mean that the selectors and also the connectors would have to duplicate a considerable portion of the link-control relays, e. g., the dialling, pulse-counting and lockout-timing relays.

The invention avoids such duplication by placing the link-control circuits ahead of the selector switches and connectors. All control functions are retained in the link-control relays which become part of the selector. After a selector has seized an idle connector, the dial pulses are counted in the link and the dialled number is transmitted by the link through the selector switch to the connector for making the individual tens or units selection. The connector performs only the function of extending the call to the called line, and requires for this purpose only four relays.

In order to accomplish the above indicated pulse transmission and the line selection operations over the customary three conductors of a selector switch, there is provided a new pulse-counting and number selection scheme for transmitting any one of ten digits by a single pulse over two conductors. This scheme comprises a new 5-relay counting chain, replacing a previously used 6-relay chain (see copending application Ser. No. 65,218), and thus makes an additional relay available in the link for a number of control functions. The use of the new counting chain is not limited to system as disclosed herein; it may be used in different signalling systems, e. g., in senders such as described in Patent No. 2,225,680.

Placing the control circuits ahead of the selector switch and reducing the functions of the connector merely to a line selection greatly simplifies the problem of furnishing special operating and supervising features.

A further object is to provide a distributor circuit for preventing blocking of equipment, e. g., of finder guard circuits, due to faults on a line such as failure of a cutoff relay to operate caused, for instance, by an open winding, which would prevent calls from other lines until the calling party on a faulty line hangs up. The distributor also indicates the faulty line, so that the trouble can be located by the maintenance personnel. In addition, the distributor maintains service, if trouble should develop in the finder and link-guard chain circuits.

Another object is accomplished by dividing the guard chains for the link marker and connector marker into two sections and routing successive calls to alternate sections.

In prior systems the marker had to be seized and the indicated selection had to be completed within the releasing time of a slow relay. In periods of heavy traffic this may cause lost calls, which will not be indicated to the calling subscribers except by failure to receive ring-back tone. The invention eliminates this potential drawback by causing the link to wait until it seizes the marker and by preventing release of the marker until the selection is completed. In case the marker is busy with other calls for an unusually long time, the calling party receives busy tone if he dials the next digit before the selection is completed. To prevent blocking the marker, it is released after a predetermined interval in the case of faults which prevent the completion of a selection.

In order to prevent double selections by simultaneous calls in the selector, the invention provides a scheme for marking an idle connector over a relatively small number of conductors and contacts of relays in an associated simple guard circuit.

The link of the invention is adapted to furnish any desired ringing arrangement.

Small rectifiers are, in accordance with the invention, used at various circuit points to eliminate relay contacts.

Figure 1A:
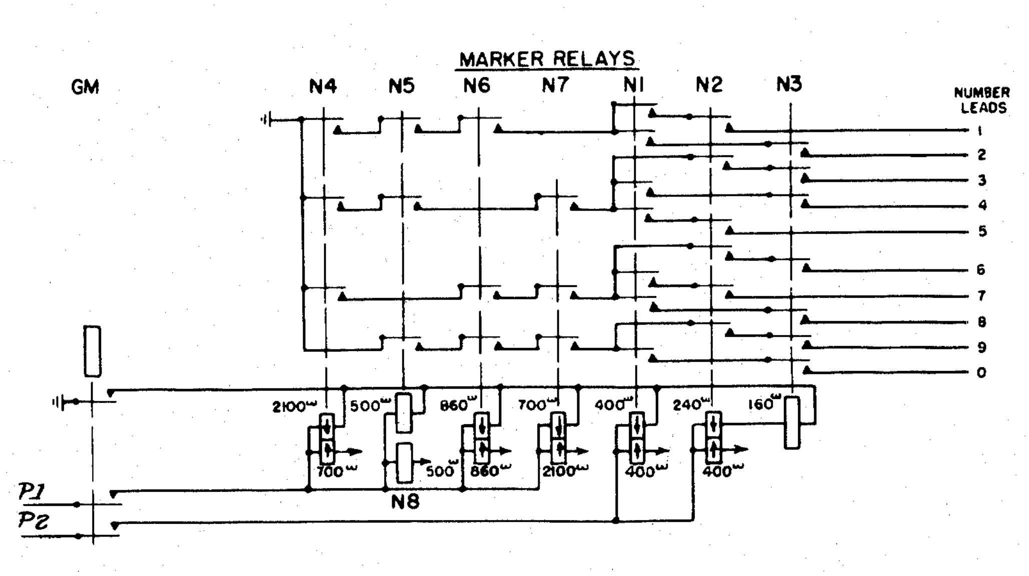
Figure 8:
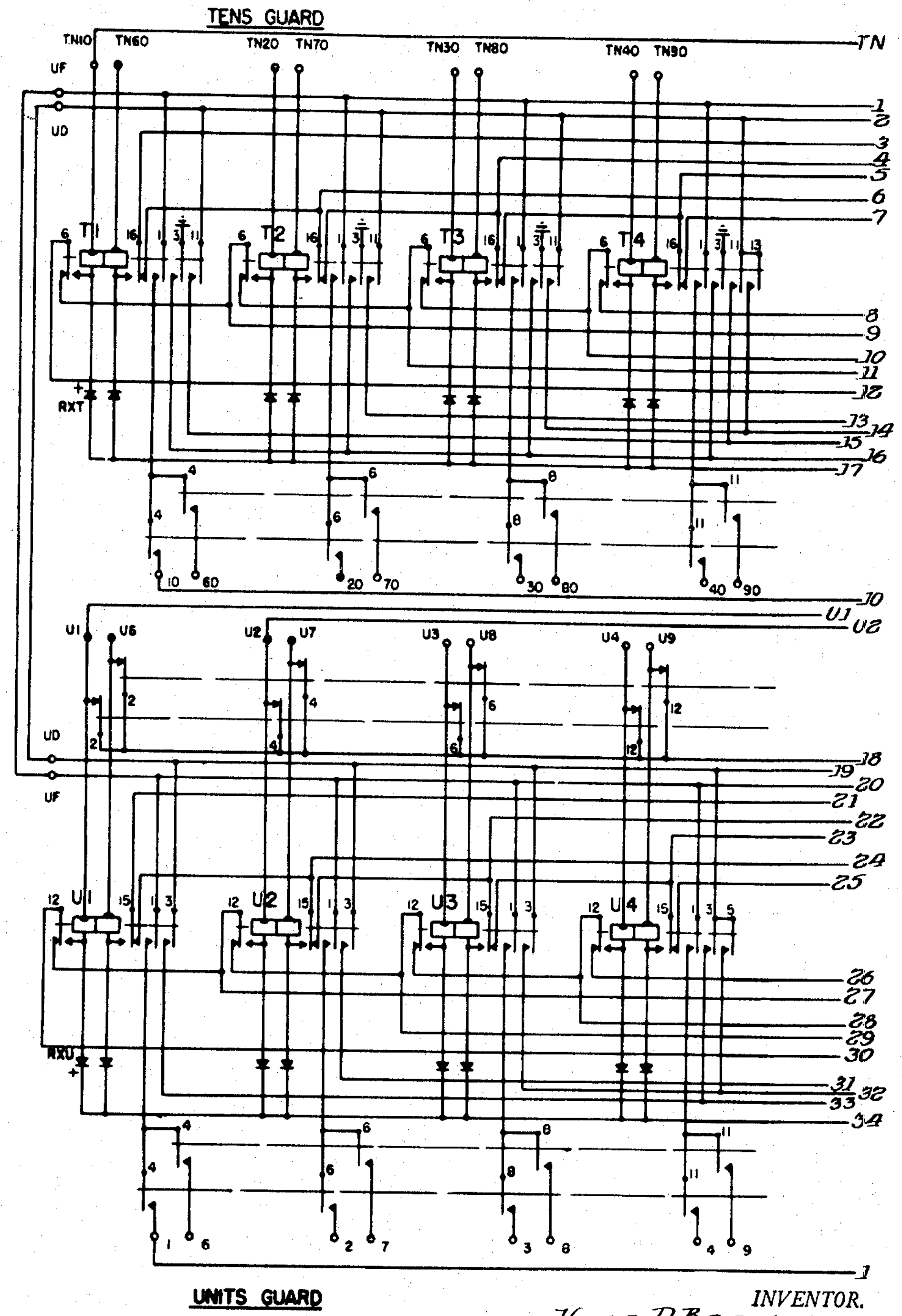
Figure 9:
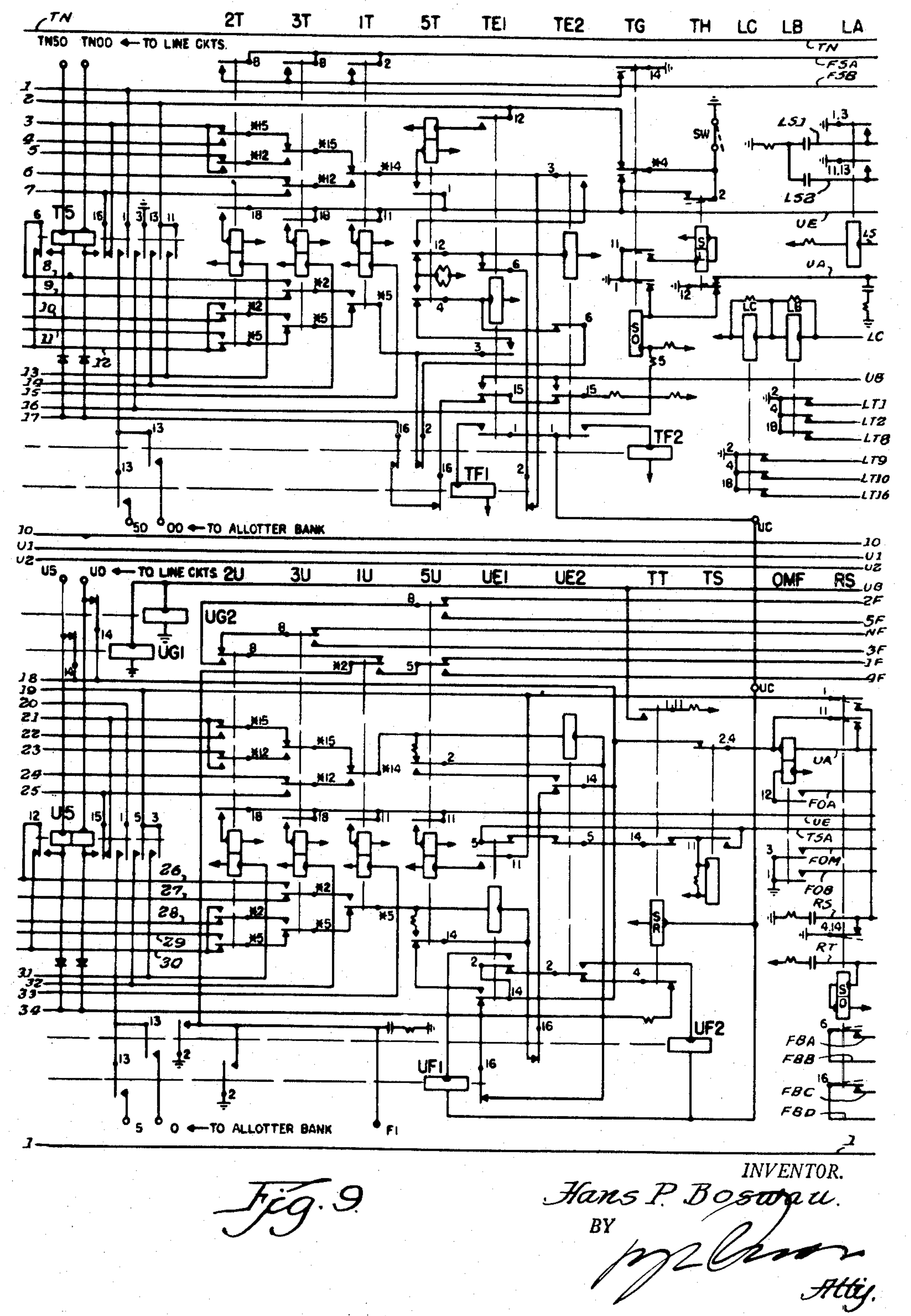
Figure 30:
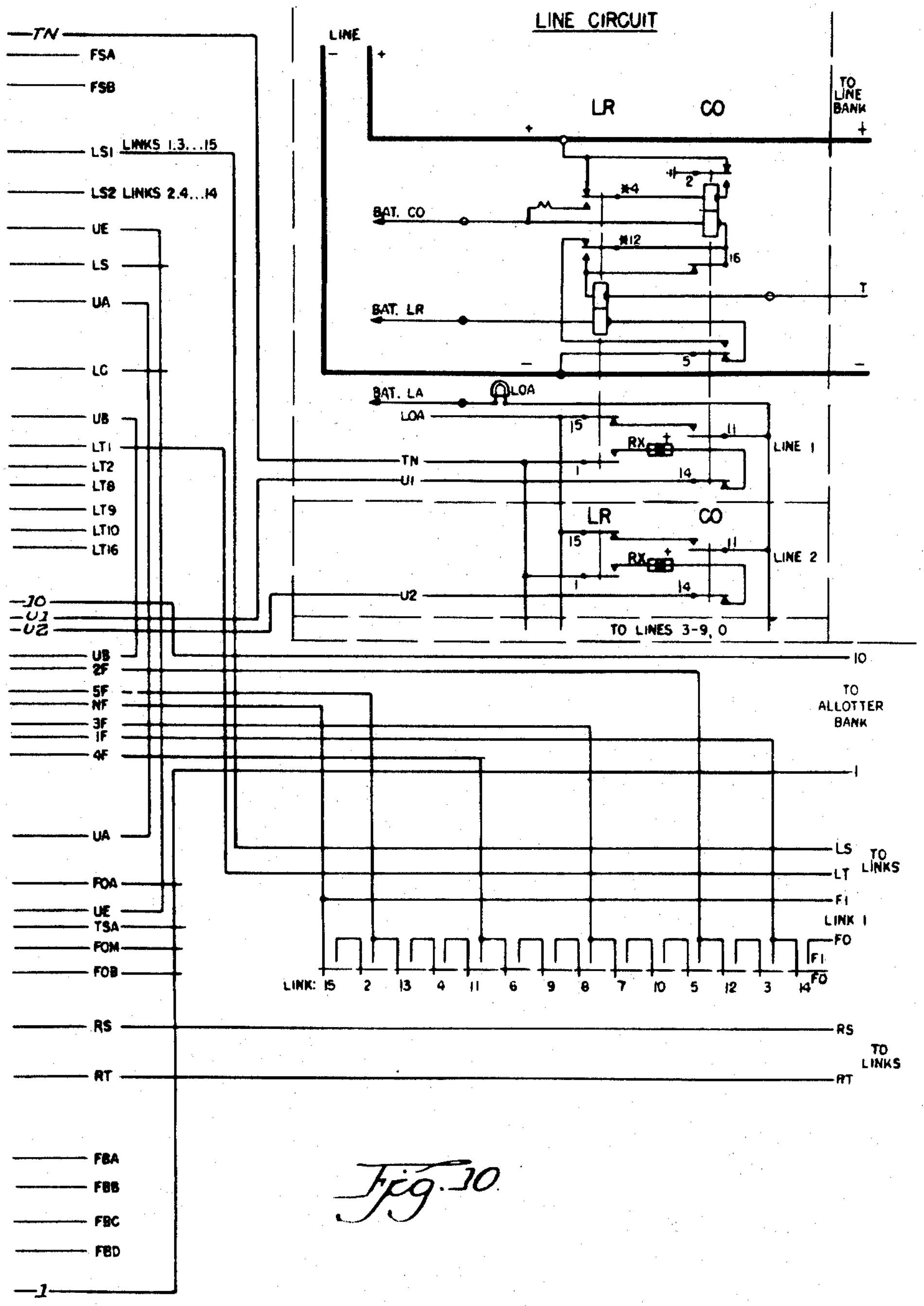
Figure 11:
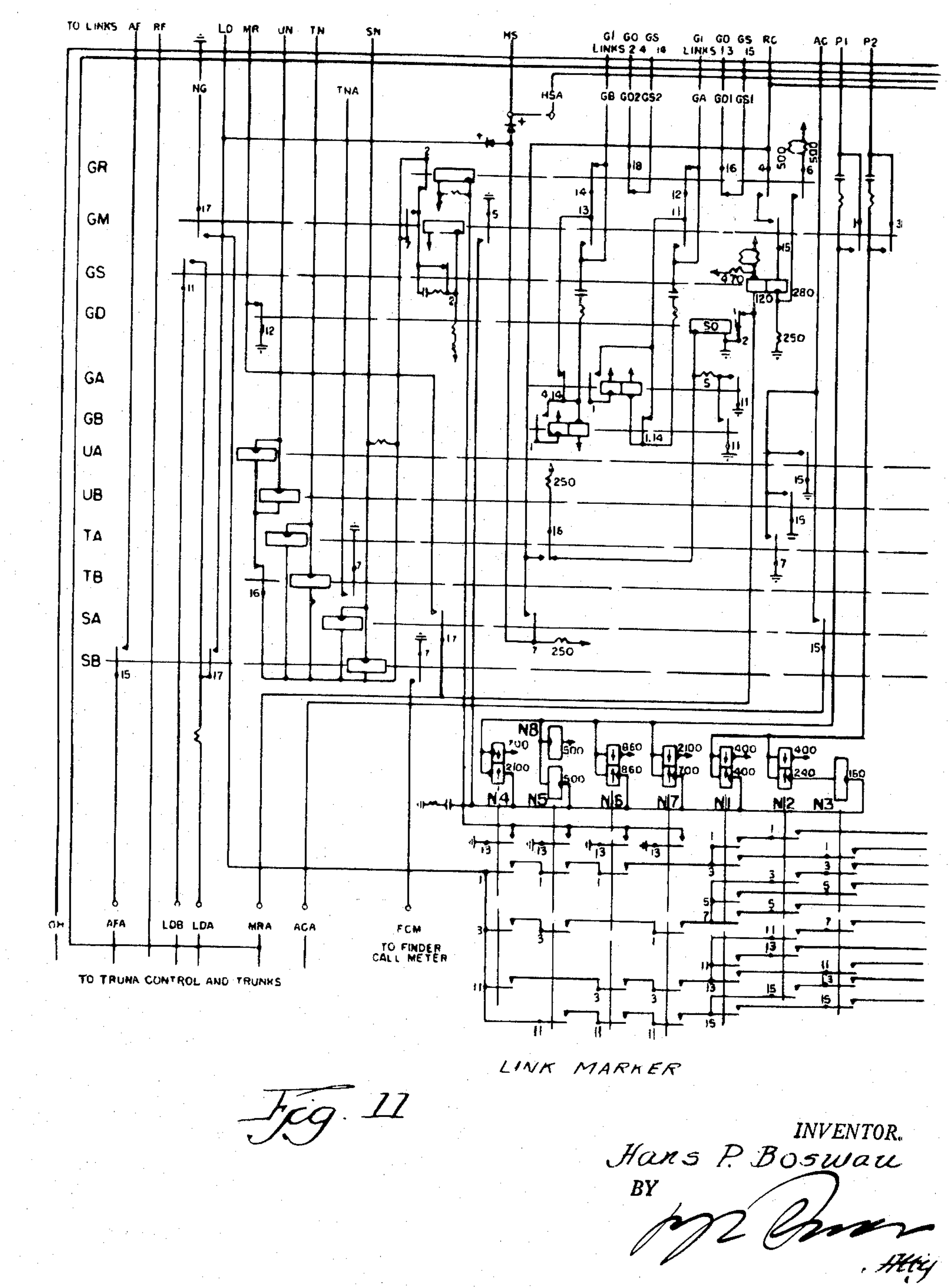
Figure 11A:
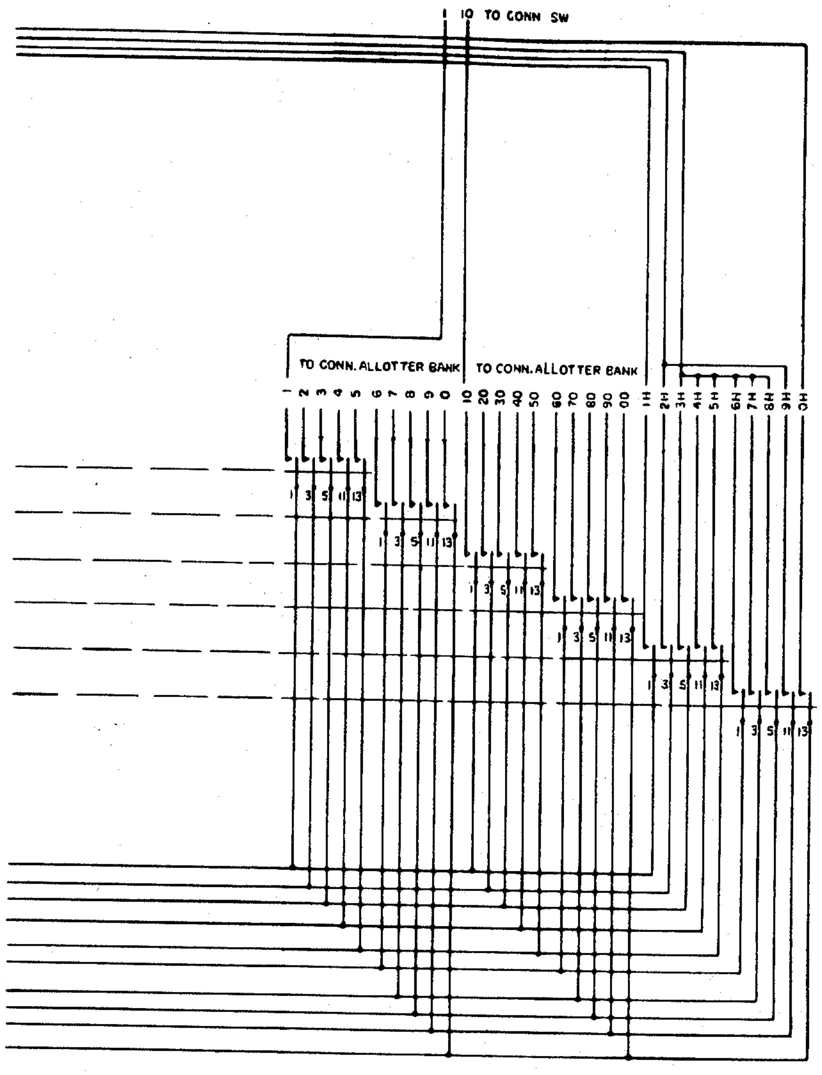
Figure 12:
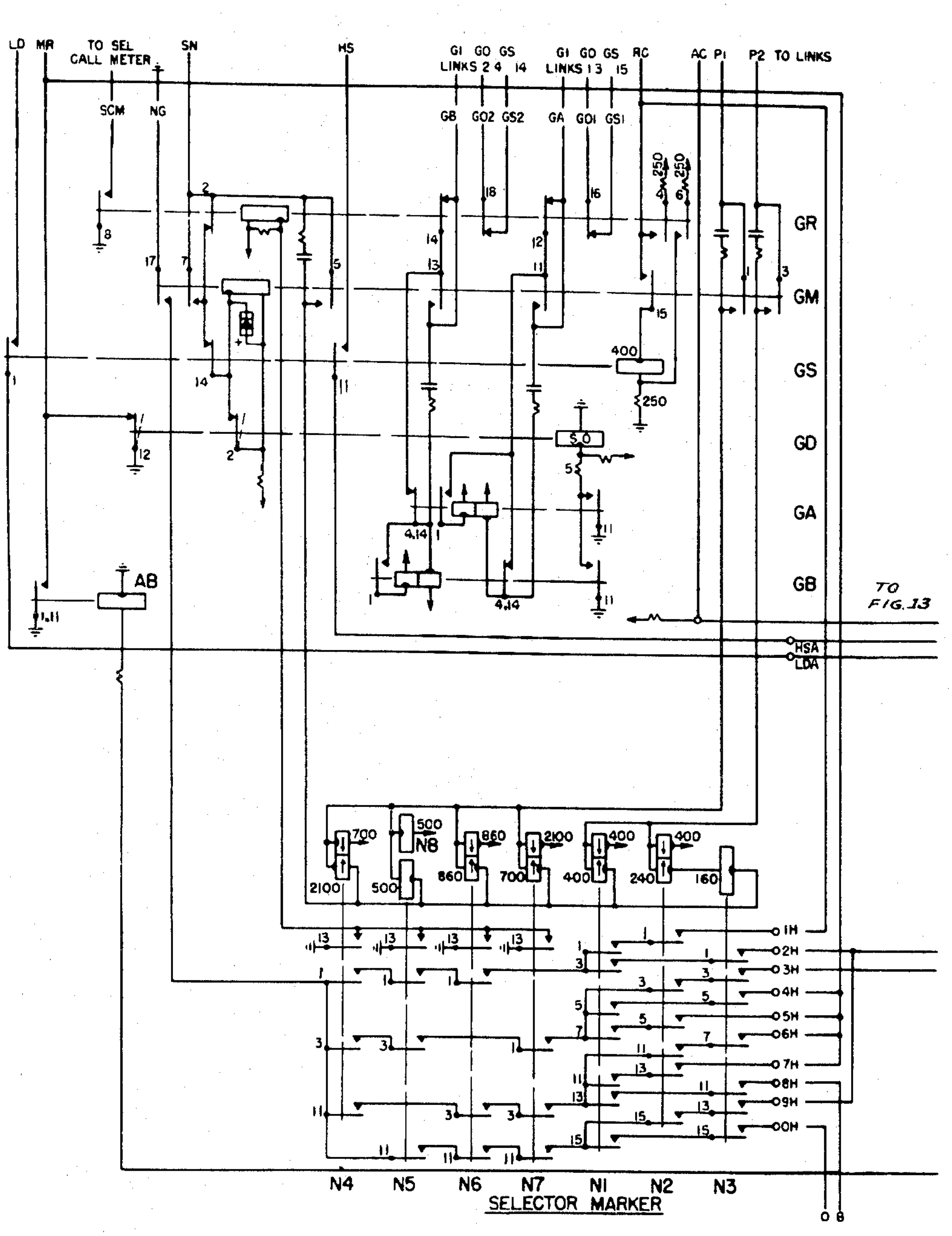
Figure 13:
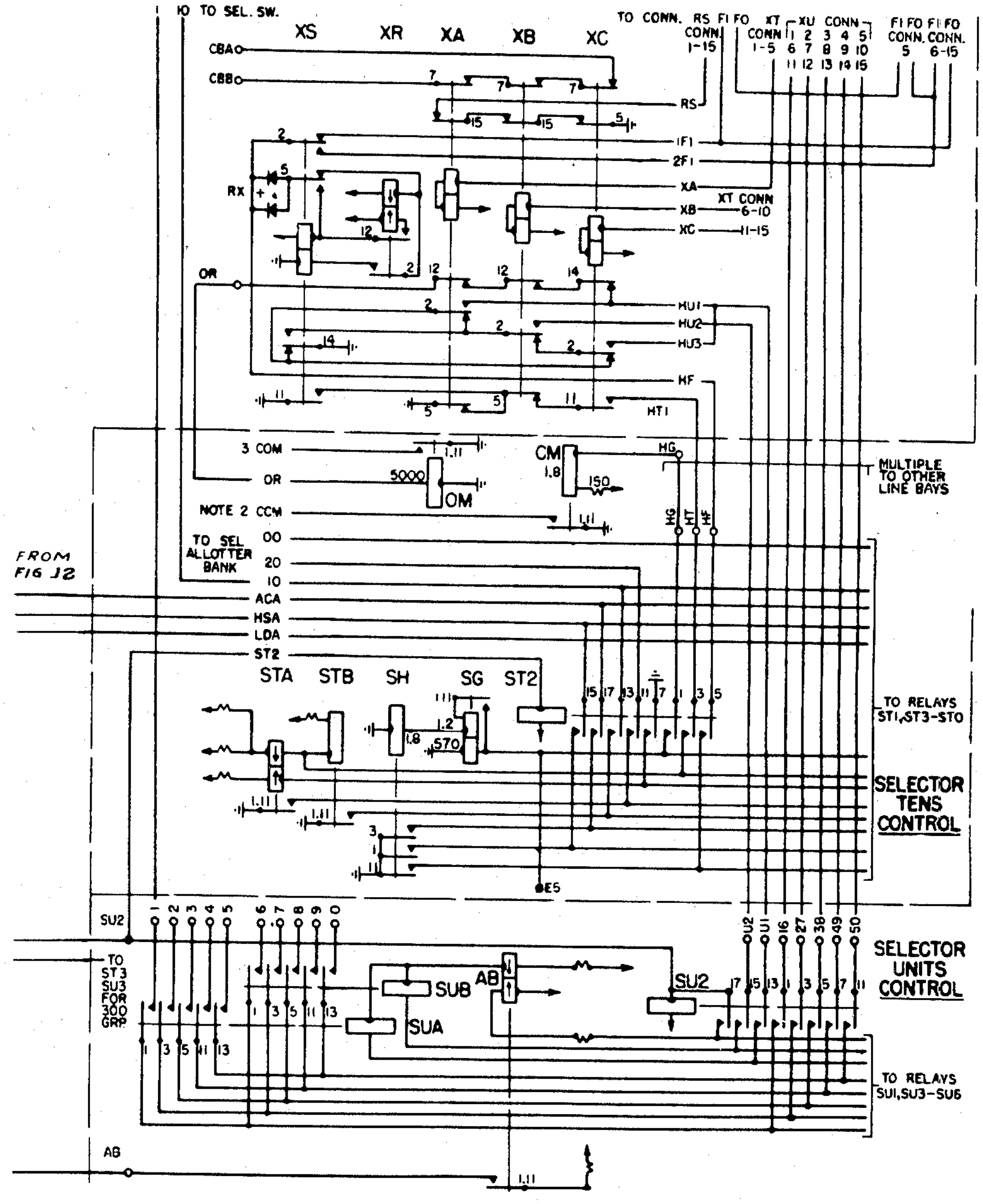
Figure 14:
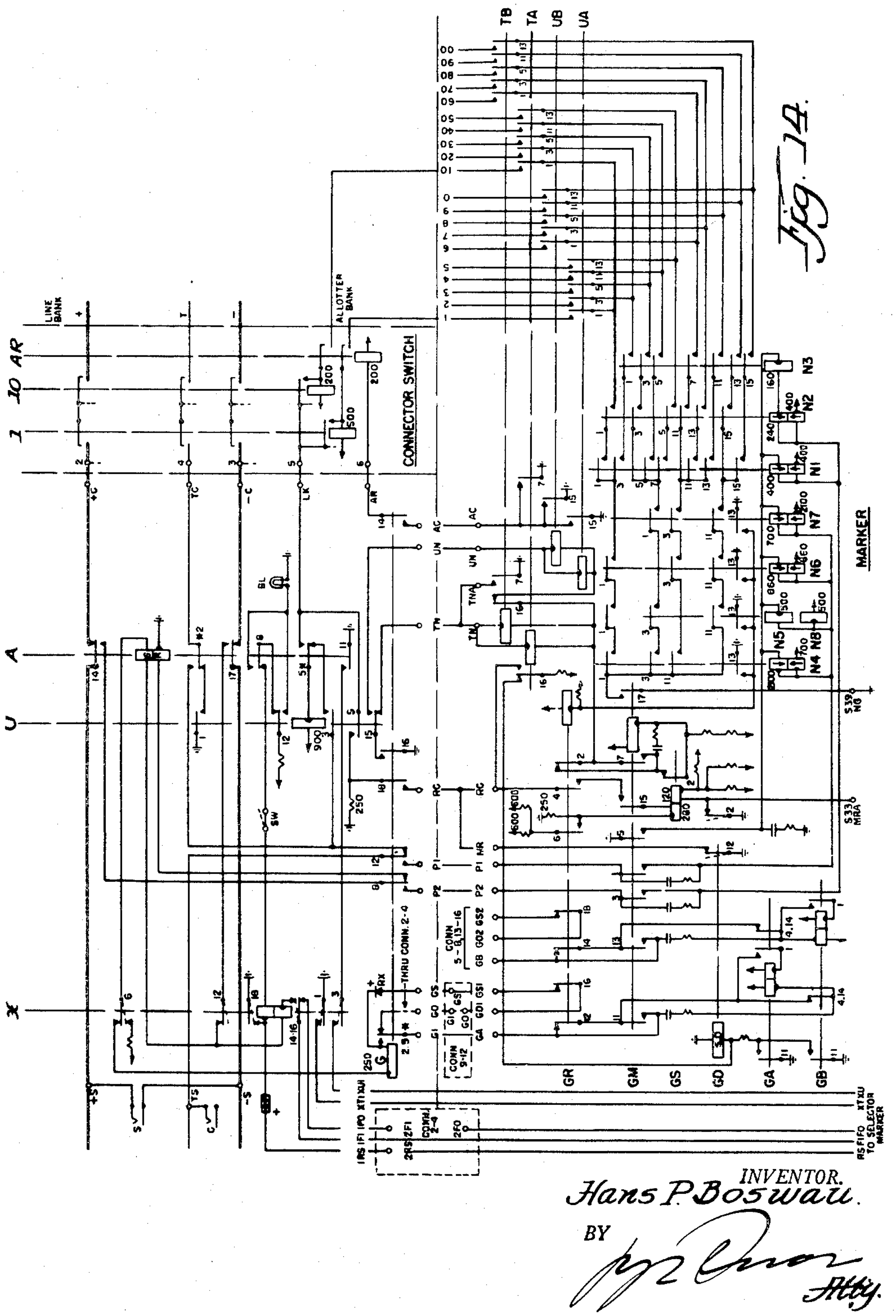

The above noted and additional features and objects will appear from the detailed description which will presently be rendered with reference to the accompanying drawings, wherein Figs. 1 and 1*a* illustrate the new pulse-counting and number selection scheme, Fig. 1*a* indicating the marker relays which receive pulses from the counting relays over the leads P1 and P2;

Figs. 2–7 are circuit diagrams and charts to aid in explaining the operations performed by the scheme shown in Figs. 1 and 1*a*;

Figs. 8, 9 and 10, when assembled with Fig. 9 at the right of Fig. 8 and Fig. 10 at the right of Fig. 9, with corresponding horizontal lines in alignment, illustrate tens and units guard circuits and a CAX-line circuit, the line circuit having been included with the guard circuits for convenience in explaining the operations incident to setting up the calls;

Figs. 11 and 11*a*, when placed together with Fig. 11*a* at the right of Fig. 11, show a link marker circuit for a 100-line board;

Figs. 12 and 13, when placed together, with Fig. 13 at the right of Fig. 12 and the corresponding horizontal lines in alignment, represent a selector marker circuit (Fig. 12) and selector tens and units control circuits (Fig. 13);

Fig. 14 shows a connector switch with marker for a selector board; and

Figure 15:
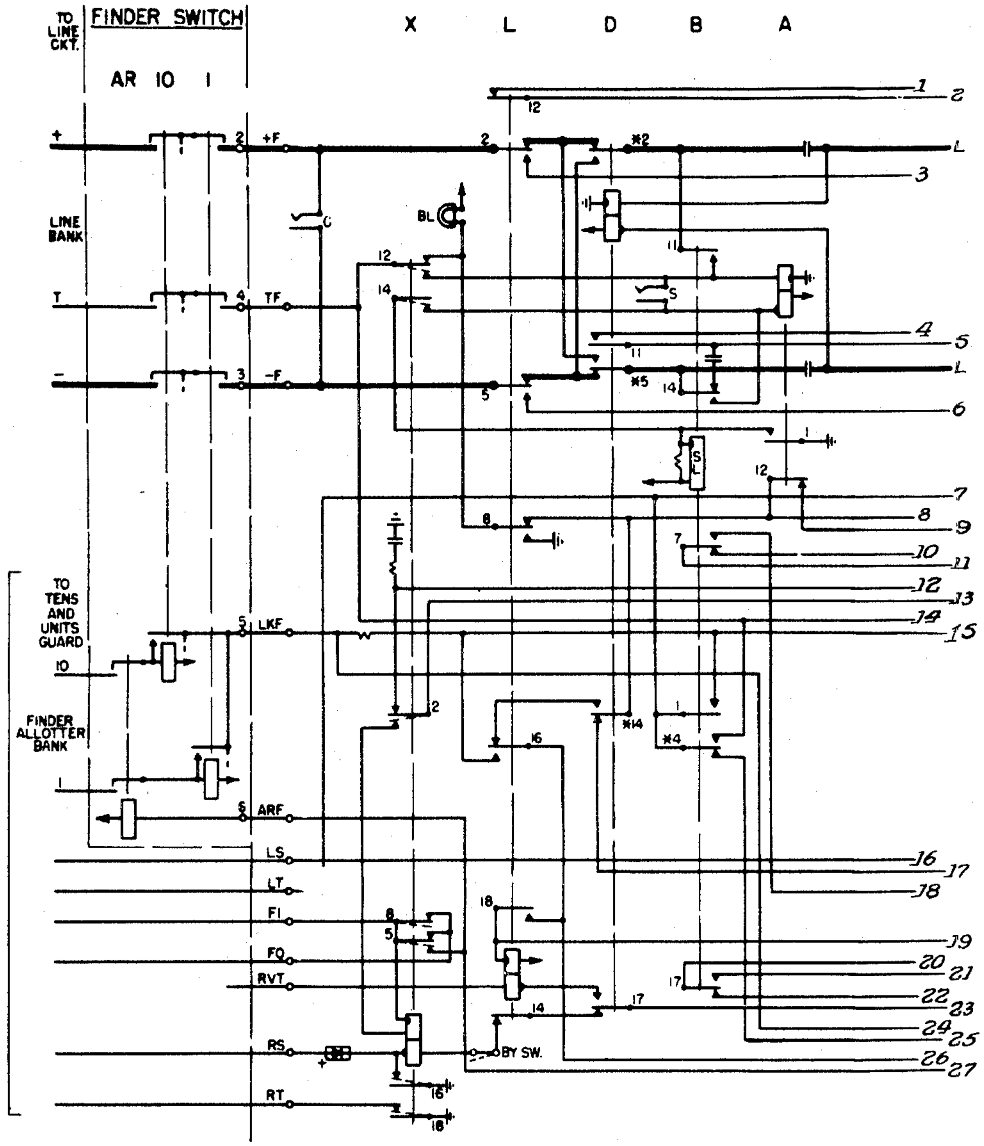
Figure 16:
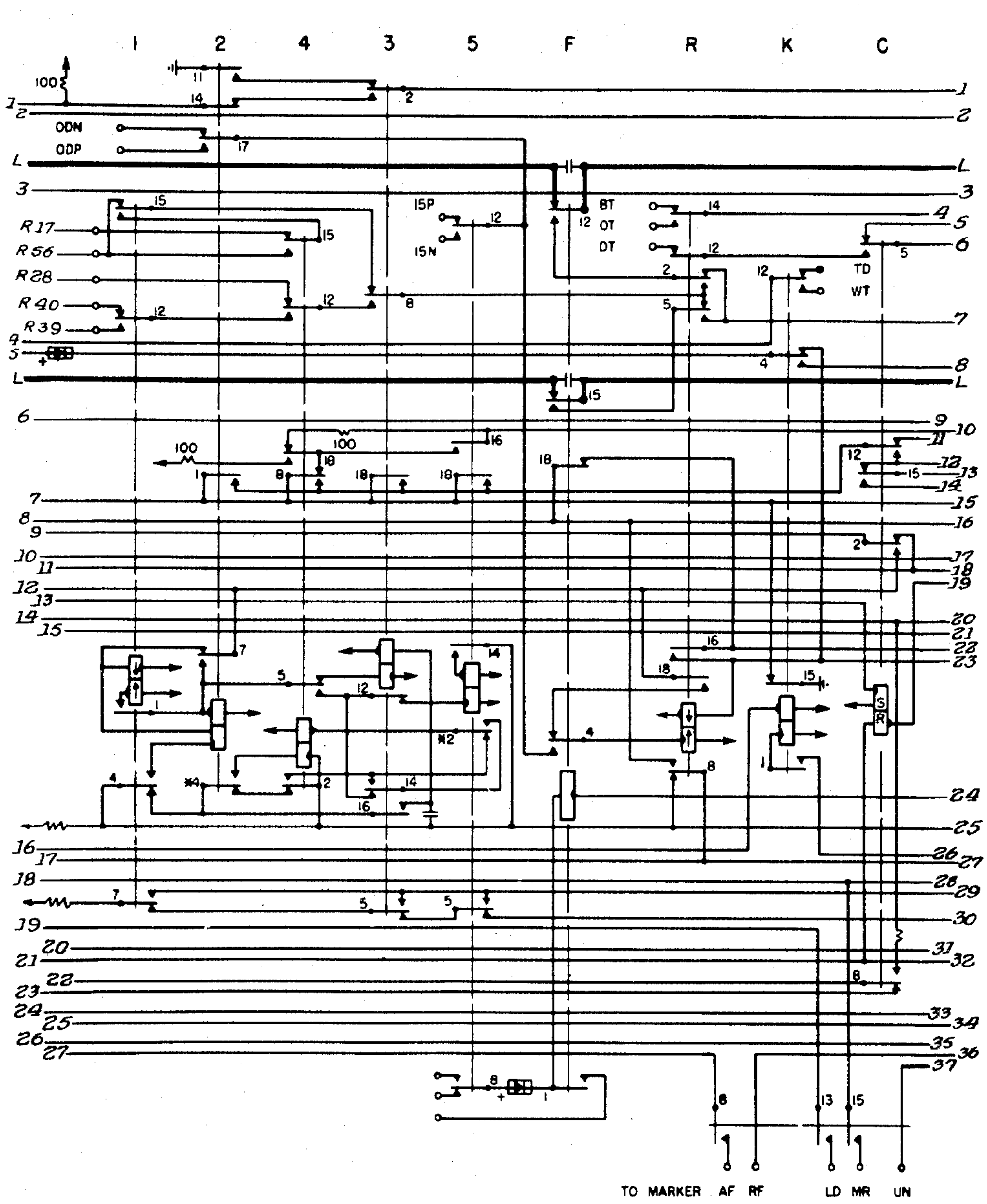
Figure 17:
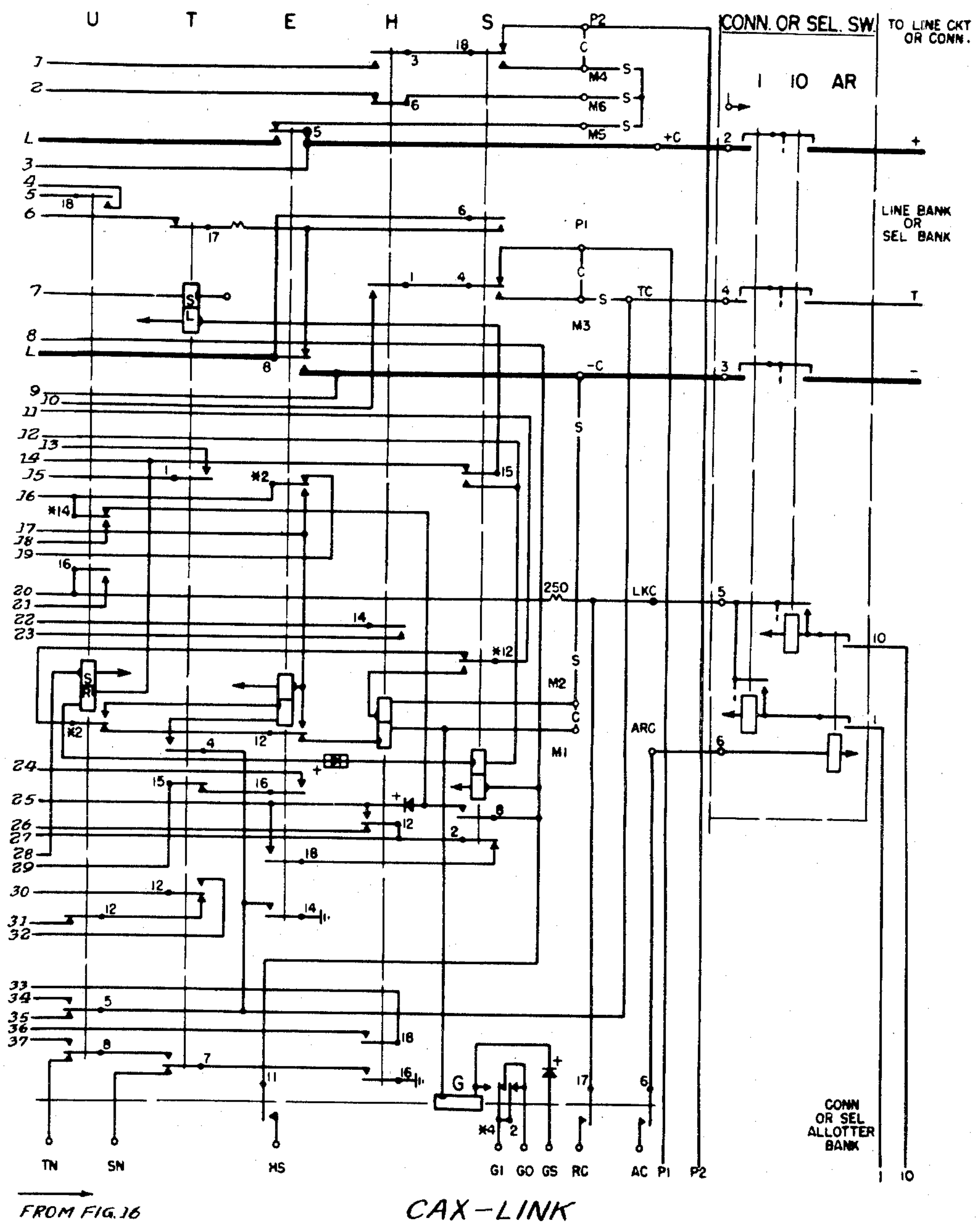

Figs. 15, 16 and 17, when placed together, with Fig. 16 at the right of Fig. 15 and Fig. 17 at the right of Fig. 16, and corresponding horizontal lines in alignment, illustrate a CAX-link for a 100-line or for a selector board.

In order to aid in reading the circuits, brief reference will now be made to the symbols used.

*Concerning symbols used*

The relays are, in the various circuit diagrams, conventionally indicated by rectangles. A faint broken line is drawn along each relay axis, and along this broken line are shown the contacts operated by the corresponding relay. In the more involved circuits, these contacts are numbered. An asterisk (*) appearing alongside a contact indicates make-before-break operation. The relay designations—letters, numbers or both—appear in most cases on the relay axes outside of the corresponding circuits so as to facilitate locating the relays. In tracing circuits, the relays will be referred to by their respective designations, e. g., A, B, C or 1, 2, 3, etc. Relay windings will be referred to by the suffix "w" or "wi" or "wo" following the relay designation, e. g., "A.w," meaning winding of relay A; "B.wo," meaning outer winding of relay B; "X.wi," meaning inner winding of relay X. The numbered contacts of the relays will be referred to by their numbers, followed by a period (.) and a letter such as "m" or "b." The letter "m" means —make—, and the letter "b" means —break—, thus giving information as to the contact function or operative position in the circuit which is being traced. Unnumbered contacts will be referred to only as to operative position (function) in the circuit being traced. For example, if the tracing of a circuit specifies that it extends from ground over A.m, B.b, C.w and X.m to battery, this means that the circuit path extends over a make contact of relay A, then over a break contact of relay B, then over a winding of relay C and finally over a make contact of relay X. Similar references will be made in the case of numbered contacts, except that the corresponding contact numbers will be mentioned in conjunction with "m" or "b," e. g., thus: A.m7, B.b2, C.w, X.m3, meaning make contact 7 of relay A, break contact 2 of relay B, winding of relay C and make contact 3 of relay X.

*Pulse-counting and number selection scheme* (*Figs. 1–7*)

This scheme will be described first with reference to the simplified circuits shown in Figs. 1 and 1*a* and explanatory chart Fig. 2, diagrams Figs. 3–6 and table Fig. 7.

The relays B and A of Fig. 1 may be in a link circuit such as shown in Figs. 15–17, where they are correspondingly marked. The link is in this case associated with a finder which connects with a calling line. The impulses produced by the dial operation are transmitted to the relay A. The call may, however, originate in another exchange, and the relays B and A of Fig. 1 are in such a case part of a trunk switch which receives dial pulses and transmits such pulses to relay A in an analogous manner. Relay A, on first energizing, causes the slow-to-release relay B to operate from ground over A.m. B holds for the duration of the pulsing.

Relays 1, 2, 3, 4, 5 are the counting relays which are in the link such as the link shown in Figs. 15–17. The counting relays absorb the pulses and transmit the digits corresponding to the dialled number over two leads P1 and P2 to the marker comprising the control relay GM and the relays N1–N8 shown in Fig. 1*a*. The marker (which has been seized by the link) is thus informed of the digit and numeral dialled. In response to receiving the corresponding digits, the marker causes the required selections to be made in the link by way of the connector-allotter bank of the links. These operations will presently be explained in detail. They have been briefly mentioned here merely as an aid to the understanding of the pulse-counting and number selection scheme.

Each of the marker relays N4, N6, N7, N1 shown in Fig. 1*a* has two opposing windings with an equal number of turns. The lower 400-ohm winding of relay N2 has three times as many turns as the upper 240-ohm winding thereof.

The length of the light vertical lines in Fig. 2 indicates the relative length of time of energization of the respective relay windings. The length of the heavy vertical lines in Fig. 2 indicates the relative length of time of relay armature operation. Dot indicates cause and arrow indicates effect.

The operation of the pulse-counting and number selection scheme is as follows:

Relay A follows the dial pulses received and operates counting relays 1–5, as shown in Figs. 2 and 7. Release of A on pulses 1, 3, 5, 7, 9 operates 1 over 2.b, A.b, B.m; re-operation of A after these pulses lets 2 operate in series with 1 over 2.w, 1.m, B.m. Release of A on pulses 2, 4, 6, 8, 0 restores 1 by energizing its opposing winding over 1.m, 2.m, A.b, B.m, and holds 2 over 2.m, A.b, B.m; re-operation of A after these pulses releases 2.

On pulse 2, release of A also operates 3 over 4.b, 2.m, A.b, B.m. After pulse 2 relay 3 locks over 3.m through 1.b and 2.b, 4.b to B.m. With 1 and 2 operated after pulse 3, relay 3 locks in series with 4 over 3.m, 2.m, 4.w, B.m. This operates 4 which locks over 5.b, 4.m, B.m. After 1 releases on pulse 4, relay 3 holds over 3.m, 1.b, B.m. Operation of 1 on pulse 5 with 2 normal opens this circuit and releases 3.

On pulse 6 with 3 normal and 4 operated, release of A operates 5 over 3.b, 4.m, 2.m, A.b, B.m, and 5 locks over 5.m, B.m and transfers the locking circuit of 4 to 5.m, 3.b, 4.m, 2.m, A.b, B.m. Re-operation of A after pulse 6 opens this circuit and releases 4.

On pulse 8 relay 3 operates the same as on pulse 2. After pulse 9 relay 4 operates the same as after pulse 3 and locks over 5.m, 3.m, 4.m, B.m.

The number dialled is transmitted to the marker over leads P1 and P2 when GM is operated. This connects P1 to ground through windings of N4–N7, totalling 200 ohms, and to battery through windings of N4, N6–N8, also totalling 200 ohms. At the same time GM connects P2 to ground through 200 ohms of N1–N3 and to battery through 200 ohms of N1–N2.

For digits or numerals 1 and 2, relays 4 and 5 remain at rest or normal, connecting P1 to ground through 100 ohms in parallel with 200 ohms through N4–N7, as diagrammatically indicated in Fig. 3. This makes the total resistance from P1 to ground 67 ohms, which is one-third of the 200 ohms through N4, N6–N8 to battery. Since the total voltage of 48 volts divides in proportion to the resistance, the voltage from P1 to ground is 12 volts and from P1 to battery 36 volts. With 12 volts on N7—700 ohms and 36 volts on N7—2100 ohms, the currents in these two windings are equal, so that N7 does not operate since its two windings have an equal number of turns and are opposing. In N4 and N6 the currents in the two windings are not equal, and these relays therefore operate. N5 has one winding and operates on 12 volts. Coil N8 balances N5 to maintain equal time constants in the two branches of P1 for faster relay operation.

For digits 3, 4, 5 relay 4 opens P1, as diagrammatically indicated in Fig. 4. This balances the currents in the opposing windings of N6, preventing its operation, and operates N4, N5, N7.

For digits 6, 7, 8 relay 5 connects direct ground to P1, as indicated in Fig. 5. This short-circuits N5 and operates N4, N6, N7.

For digits 9, 0 relays 4 and 5 connect P1 to battery through 100 ohms, as indicated in Fig. 6. This balances the currents in the opposing windings of N4 and operates N5, N6, N7.

For digits 1, 5, 7 relay 2 connects direct ground to P2. This short-circuits N3 and operates N1 and N2.

For digits 2, 4, 8, 0 relay 3 connects P2 through 100 ohms to battery, as indicated in Fig. 6. With 36 volts on P2, the current through N2—240 ohms and N3—160 ohms is three times the current through N2—400 ohms. Since N2—400 ohms has three times as many turns as N2—240 ohms, the effect of the two windings is balanced, and N2 does not operate. N1 and N3 operate.

For digits 3, 6, 9 relays 2 and 3 open P2, as indicated in Fig. 4. This balances the currents in the opposing windings of N1 and operates N2 and N3.

Operating N1–N7 in these combinations by relays 1–5 selects the number lead corresponding to the number dialled. The manner in which the marking of the selected number leads effects the selection operations of the link will be explained later on with reference to Figs. 11–11*a*, 12–13, 14 and 15–17, after describing the tens and units guard circuits and the cooperation thereof with the CAX-line circuit in setting up calls.

*CAX-line circuit and tens and units guard, Figs. 8–10*

The leads marked in Fig. 10 by LS, LC, FOA, FOM, FOB and LOA go to a power panel (not shown). The leads FSA and FSB (top left in Fig. 10) go to a finder guard alarm if such is used. Leads FBA, FBB, FBC, FBD (bottom left in Fig. 1) are for all-link-busy signal or metering. Lead F1 (bottom of Fig. 9) is for finder call metering, if used.

The line circuit on top of Fig. 10 is one of ten such circuits serving a 10-line group with an identical digit in the line numbers. The circuit provides lockout for permanent lines and serves for reverting calls, permitting release of the link (Figs. 15–17) after the call is answered.

The tens and units guard prevents interference between calls landing at the same instant; provides a distributor circuit for maintaining service under various trouble conditions; supplies lockout timing pulses to the links; and re-sets idle links after all links have been engaged in rotation.

The operations in case of an incoming call are as follows: Relays TG and TH are normally operated, and idle links apply ground to lead RT operating SO. Lifting the hand set at a subscriber's station closes a D. C. bridge across the line. This operates LR from battery through LR.w, CO.b5 over the line to CO.b2 and ground. LR of line 11, which is shown on the circuit (top of Fig. 10), closes a circuit from lead TN to lead U1. Each of the ten leads TN10–TN00 is associated with a different 10-line group, and identifies the tens digit of the calling line. The ten leads U1–U0 are multipled to all 10-line groups and identify units digits of the calling line.

Connecting TN to U1 operates T1 (left side of Fig. 8) from battery over resistances TE2.b15, TE1.b15, TF1.b16, TF2.b16, RXT, T1.wi, lead TN10, LR.m1, RX, CO.b14, lead U1, UG1.b2, TS.b2.4, RS.m1.11 and over UA to ground at TG.m12. Rectifiers RX prevent crosses between leads TN10–TN00 and U1–U0 when several calls land at the same time.

Operation of T1 contacts TE1 over T1.m6, 2T.b5, 3T.b5, 1T.b5, TF2.b2, TE2.b6, TE1.w to battery in parallel with RXT and 100 ohms. This operates TE1, which opens the battery through 100 ohms, but T1 holds over T1.m6, etc., in series with TE1. The holding circuit of T1.wi–T5.wi is carried through series contacts T1.b6–T5.b6, and the holding circuit of T1.wo–T5.wo is opened by TE1.b6 so that only one of the relays T1–T5 can remain operated if more than one should have been operated by simultaneous calls in different 10-line groups. Rectifiers RXT keep the holding circuits of T1–T5 separated.

TE1 also operates UG1–UG2 over TE1.m15, TE2.b15 and the two resistances connected to TE2.b15 to battery. This opens the direct path from lead U1 through UG1.b2 to TS.b2.4 and lets U1 operate from lead U1 through U1.wi, RXU, a resistance TT.b4, UE2.b2, UE1.b2 to TS.b2.4. Operation of U1 connects UE1 over U1.m12, 2U.b2, 3U.b5, 1U.b5, UE1.w, UF2.b16, UF2.b2 in parallel with RXU and the resistance shown underneath TT.b4. This operates UE1 which connects rectifiers RXU from ground through TS.b2.4, but U1 holds over U1.m12, etc., in series with UE1. The holding circuit of U1.wi–U5.wi is carried through series contacts U1.b12–U5.b12, and the holding circuit of U1.wo–U5.wo is opened by UE1.b14 so that only one of the relays U1–U5 can remain operated if more than one should have been operated by simultaneous calls in the same 10-line group. Rectifiers RXU keep the holding circuits of U1–U5 separated.

UE1 also operates TT, UF1 and TF1 from ground through TS.b2.4 over UE1.m2, UF.w to TT.w and TE1.m1, TF1.w.

In the selection of a line, relays TG.TH.RS.T1.TE1. U1.UE1.UF1.TT.TF1 will be operated. UF1 connects ground over UF1.m2, 1U.b2, 2U.b8, 3U.b8 and terminal NF to lead FI of link 1, from there—if the link is busy—through FO to FI of the next link, etc., through busy links to FI of an idle link. At the same time ground is applied through TG.m14, T1.M1, TF1.m4 to finder-allotter bank bar 10 and through TG.m14, U1.m1, UF1.m4 to finder-allotter bank bar 1, thus marking the tens and units digit of the calling line. Ground on F1 of an idle link operates its finder-allotter magnet which connects the coils of the finder tens and units magnets to the allotter bank bars, thereby operating the tens coil and the units coil corresponding to the marked allotter bars. This connects the calling line through the finder switch to the link operating relays in the link, which apply ground to test wire T of the calling line.

Ground on the test wire T holds LR and operates CO over LR.wi, LR.m12, CO.wo. With LR and CO operated the windings of both relays are disconnected from the + and — line, clearing the line for dialling and talking. An additional circuit for CO is closed over CO.m2, CO.wi, LR.m4 and a resistance to battery for lockout testing, as will presently be explained.

Calls from lines 12–15 operate T1, TE1, U5 and UE1, as described. Calls from lines 61–69, 60 also operate T1, but over lead TN60 of T1.wo, and in this case TE2 operates instead of TE1 over T1.m16, T2.b15, 3T.b15, 1T.b14, TF1.b2, TE1.b6, TE2.w, preparing a circuit for the subsequent operation of TF2, which applies ground to allotter bank bar 60. In a similar manner, calls from lines 16, 26 . . . 06 operate U1 and UF2 over lead U6, causing the subsequent operation of UF2, which applies ground to allotter bank bar 6. In general, incoming calls operate the tens and units guard relays as follows:

TABLE A

| Lines | Operate | Lines | Operate | Lines | Operate | Lines | Operate |
|---|---|---|---|---|---|---|---|
| 11–19, 10 | T1 TE1 | 61–69, 60 | T1 TE2 | 11, 21 . . . 01 | U1 UE1 | 16, 26 . . . 06 | U1 UE2 |
| 21–29, 20 | T2 TE1 | 71–79, 70 | T2 TE2 | 12, 22 . . . 02 | U2 UE1 | 17, 27 . . . 07 | U2 UE2 |
| 31–39, 30 | T3 TE1 | 81–89, 80 | T3 TE2 | 13, 23 . . . 03 | U3 UE1 | 18, 28 . . . 08 | U3 UE2 |
| 41–49, 40 | T4 TE1 | 91–99, 90 | T4 TE2 | 14, 24 . . . 04 | U4 UE1 | 19, 29 . . . 09 | U4 UE2 |
| 51–59, 50 | T5 TE1 | 01–09, 00 | T5 TE2 | 15, 25 . . . 05 | U5 UE1 | 10, 20 . . . 00 | U5 UE2 |

TE1 opens the circuit of TE2 at TE1.b6 and, conversely, TE2.b6 opens the circuit of TE1, so that operation of one prevents operation of the other. Should simultaneous calls operate TE1 and TE2 at the same instant, TE1 holds over 5T.4, TE1.m3 and opens the holding circuit of TE2 at TE1.b6 so that TE2 releases. In a similar manner UE1.b14 opens the circuit of UE2 and UE2.b14 that of UE1, while UE1 holds over 5U.b14 and UE1.m14, if both should operate at the same instant. The operated relays mark the calling line on the finder-allotter bank bars corresponding to the line number.

The release of the tens and units guard is accomplished as follows:

Relay CO opens the circuit from lead TN to lead U1, thereby releasing T1, TE1, U1, UE1 which in turn release TF1, UF1 and TT. This disconnects ground from allotter bars 10 and 1, and from lead FI, releasing the finder-allotter relay and freeing the allotter bank bars. Slow-to-release relay TT remains operated for a brief interval, holding UG1–UG2 and keeping the circuit through TT.b4 open. This insures release of the tens and units guard and of the finder-allotter relay before the next call can land. Release of TT and UG1–UG2 then restores the tens and units guard to normal, ready for the next call.

In case of an outgoing call, when a line is called, the connector seizing the line connects ground to its test wire T, operating LR and CO in series over LR.wi, CO.b16, CO.wo. Due to a much larger number of turns in its winding, LR operates before CO, maintaining the circuit over LR.m12 before CO can break it at CO.b16. The subsequent operations of the line circuit are the same as for an incoming call.

When the connection is released, either on an incoming or on an outgoing call, ground is removed from test wire T, opening the circuit of LR while CO is still being held over CO.m2, CO.wi, LR.m14, 1500 ohms. The release of LR, before breaking this holding circuit for CO, connects CO to the line loop from battery through CO.wo, LR.b12, CO.m5 over the line to LR.b4, CO.wi, CO.m12 and ground. If the line is clear, CO finds this circuit open and releases, thereby restoring the line circuit to normal.

On lockout and reverting call, if the line is not clear when LR releases, CO finds this circuit over the line closed and holds until the line is cleared. CO then releases and restores the line circuit to normal.

During lockout, with CO held and LR released, battery through CO.wo is disconnected from test wire T by CO.b16. Absence of battery on test wire T marks the line as busy. A circuit is also closed through lamp LOA, CO.m11, LR.b15 to lead LOA for operating a lockout alarm relay as long as a line is on lockout. This alarm relay may be short-circuited by a key on the power panel which lights lamps LOA of all 10-line groups having lines on lockout.

On reverting calls CO is held over the line by the talking parties after the link is released, feeding transmitter battery to the line over the two balanced windings of CO. When the talking parties hang up, CO releases and restores the line circuit to normal.

As long as at least one link is available for calls, ground is applied by the links to lead RT, operating SO. Seizure of the last available link removes ground from lead RT. This releases SO which in turn applies ground to lead RS. If any links are idle at the time, ground on lead RS operates a relay in each idle link, which makes the link available for calls and applies ground to lead RT. This reoperates relay SO.

When all links are busy, SO releases as described in the preceding paragraph and inserts high-resistance relay OMF in series with ground through TS.b2.4. Incoming calls then operate OMF, but T1–T5, etc. do not operate through high-resistance relay OMF, so that calls cannot land. OMF operates a finder overflow meter over lead FOM, starts the busy interrupter over lead FOB, and locks to ground on lead FOA. Ground on FOA is briefly interrupted at one second intervals by the busy interrupter. This permits OMF to release when the calling party hangs up, but prevents false operations of meter FOM in case the calling party should inadvertently proceed to dial. Release of SO also closes circuits from lead FBA to FBB and from FBC to FBD for operating a finder-busy signal or a finder-busy timing meter, if desired.

A timer is provided (not shown) which delivers lockout timing pulses at three-minute intervals to leads LS and LC, and these pulses operate LA, LB, LC. Relay LA repeats the pulses from lead LS to the links. LB and LC briefly open ground on leads LT to each link.

Next to be described is the distributor circuit.

Each incoming call operates one of the relays T1–T5 and TE1 or TE2 as described. T1–T5 short-circuit slow-to-release relay TG over 5 ohms. On normal calls T1–T5 do not operate long enough to let TG release. If for any reason the call fails to land properly, T1–T5 remain operated longer than the normal time and cause TG to release. If the call is from line group 10, release of TG operates 1T over T1.m11, TG.b4 and 5T over TE1.m12, TG.b14. Calls from other line groups operate 1T–5T as shown below in Table B. At the same time, 1U–5U are operated by U1–U5 and UE1 in a similar manner. As a result, the line attempting to call is identified by the relays 1T–5T and 1U–5U which are operated:

TABLE B

| Relays Operated | Line Group | Relays Operated | Line Group | Relays Operated | Units Digit | Relays Operated | Units Digit |
|---|---|---|---|---|---|---|---|
| 1T 5T | 10 | 1T | 60 | 1U 5U | 1 | 1U | 6 |
| 2T 5T | 20 | 2T | 70 | 2U 5U | 2 | 2U | 7 |
| 3T 5T | 30 | 3T | 80 | 3U 5U | 3 | 3U | 8 |
| 1T 3T 5T | 40 | 1T 3T | 90 | 1U 3U 5U | 4 | 1U 3U | 9 |
| 2T 3T 5T | 50 | 2T 3T | 00 | 2U 3U 5U | 5 | 2U 3U | 0 |

Release of TG also disconnects ground from the alloter bank bars at TG.m14 and opens the circuit of slow-to-release relay TH which releases after a brief delay. TH.m12 opens and releases those of relays T1–T5, TE1, TE2, U1–U5, UE1, UE2, TF1, TF2, UF1, UF2, TT which are operated at the time. 1T–5T and 1U–5U lock over TH/b2 and subsequently over TG.m4. Release of T1–T5 opens the short circuit on TG and lets TG operate again over 250 ohms, TG.w, TH.b12. Relay TG locks over TG.m1 and operates TH over TG.m11. This restores the tens and units guard to normal, except that certain relays 1T–5T and 1U–5U are operated, and now the calling line attempts to land once more.

The function of relays 1T–5T and 1U–5U is to shift the starting points in the guard chains of T1–T5 and U1–U5 in such a manner that the line failing to land will be the last choice in these chains. This gives all other lines preference in landing and insures that no other line can be blocked.

For example, if line 11 is calling but cannot land because its relay CO fails to operate, T1.TE1.U1.UE1 are operated when TG releases. This operates and locks 1T.5T.1U.5U. Normally the battery supply through TE1 enters the guard chain T1.b6–T5.b6 at T1, but with T1 operated it is shifted by 1T.m5 to T2, making T2 the first choice and T1 the last choice. In a similar manner TE2 is shifted by 1T.m14 from T1 to T2. At the same time, the 50-ohm shunt across TE2.w through 5T.b12 is shifted to TE1 by 5T.m4. This makes TE1 slower to operate than TE2. Moreover, 5T opens the locking circuit of TE1 through TE1.m3 at 5T.b4 and prepares a corresponding locking circuit for TE2 through TE2.m3 at 5T.m12. As a result, TE2 is given preference in case both TE1 and TE2 should attempt to operate at the same time due to simultaneous calls.

In the units guard, 1U.m5 shifts UE1 from U1 to U2, and 1U.m14 shifts UE2 from U1 to U2. In addition, 5U.b2 opens the 250-ohm shunt across UE2, and 5U.m14 connects a 250-ohm shunt across UE1. The locking circuit of UE1 through UE1.m14 is opened by 5U.b14 and 5U.m2 prepares a locking circuit for UE2 through UE2.m14. This gives UE2 preference over UE1. If any other line fails to land properly, 1T–5T and 1U–5U are operated in a different combination, so as to make the line in trouble the last choice.

If CO fails to operate due to trouble in the line circuit, the line repeats its attempts to land, releasing and reoperating TG and TH until the calling party hangs up. Any other line calling during this time lands as soon as TH is re-operated, and then the faulty line resumes its attempts to land. If two or more lines calling at the same time should fail to land due to trouble in the line circuits, they shift the guard preference back and forth from one line to the other and alternate in making attempts to land. For example, if lines 11 and 78 should be in trouble, line 11 operates 1T.5T.1U.5U as described, making line 11 the last choice. Then line 78 attempts to land, releases these relays by TG.m4 opening with T11.b2 still open and operates 2T.3U when TG releases. This makes line 78 the last choice and lets line 11 make the next attempt, which releases 2T.3U and reoperates 1T.5T.1U.5U.

If CO fails to operate on an incoming call because of trouble in the link, 1T–5T and 1U–5U operate as described, but the next attempt to land will seize another link—unless all other links are busy—and will land on that link.

If the call fails to land due to trouble in the guard chains, 1T–5T and 1U–5U also operate as described, shifting the starting point in the guard chains. For example, if T1.b6 should fail, calls from line groups 10 and 60 to 00 can land, but calls from line groups 20 to 50 will not land until a call in a preceding line group has failed to land and shifted the starting point. Thus a call from line group 30 will operate 3T and 5T, shifting the starting point over 3T.m5, 2T.b2 to T4 so that subsequently calls from line groups 40 and 50 can land. A call from line group 20 operates 2T and 5T, shifting the starting point to T3, and from then on all calls can land except calls from line group 20. Corresponding functions take place if contacts in guard chains T1.b16–T5.b16, U1.b12–U5.b12 or U1.b15–U5.b15 should fail.

Failures in the shift circuit contacts of 1T–5T or 1U–5U cause similar functions and eventually a combination will be reached which lets all calls land. For example, if 1T.b5 should fail, any call from line groups 10, 40, 60 or 90 will operate 1T, and with 1T operated all calls can land.

On normal calls UF1 or UF2 place ground over lead NF on lead FI of the first link. If the FI–FO chain in the links should be open, the starting point is shifted by 1U–5U until calls can land again. For example, if the circuit to FO should be open in the first link, a call from any line would operate at least one of relays 1U–5U, say 1U. This shifts the starting point over 1U.m2, 5U.b5 and lead 1F to link 3, and from then on all links accept calls again, except link 14 if equipped.

When the maintenance man finds any of the relays 1T–5T and 1U–5U operated, he should note them down and then release them by briefly opening a switch in the tens guard. To locate the trouble, it is necessary to find the line indicated by the operated relays with the help of Table B. For example, if 1T.3T.5T and 3U are found operated, line group 40 and units digit 8 indicate line 48. This line should then be called and, if the corresponding LR and CO do not operate, the trouble is in such line circuit. If they do operate, a call should be initiated from this line on every link to check for trouble in one of the links. If the line lands on all links, it will be necessary to check for trouble in the guard chains and in the FI–FO chain of the links.

In a 100-line board, calls to trunks terminated on trunk switches are transferred from the calling link to an idle trunk switch by operating the finder-allotter relay in the calling link, the connector-allotter relay in the idle trunk, and a common allotter switch which connects the finder-allotter bank to the connector-allotter bank. To avoid interference, UE1.b5, UE2.b5 and TT.b14 temporarily disconnect battery through relay TS from lead TSA to prevent trunk switch calls while a call is landing on a link. Conversely, a trunk switch call temporarily operates relay TS which opens ground through TH.m12, RS.m.11 to prevent simultaneous landing of calls. Should UE1 or UE2 and TS happen to operate at the same instant, TS locks over TS.m11 while TS.b2.4 releases whichever of relays T1–T5, TE1, TE2, UG1–UG2, U1–U5, UE1 and UE2 are operated at the time. After the trunk switch call is transferred, TS releases and lets the waiting call land on a link.

It may be mentioned, in concluding the description of Figs. 8–10, that the use of rectifiers as shown in these figures and as previously stated eliminates relay contacts, thus simplifying the circuits and providing for reliable operation. In the case of the line circuit shown in Fig. 10, the use of the rectifiers as shown eliminates a series of ten break contacts for each 10-line group required in prior systems.

*Link marker for 100-line board, Figs. 11–11a*

The leads AF, RF . . . P1, P2 on top of Fig. 11 connect with similarly designated terminals shown at the bottom of Figs. 16 and 17 (CAX–link), and the leads 1 and 10 on top of Fig. 11*a* connect with similarly marked terminals appearing at the bottom of Fig. 17. The leads at the bottom left of Fig. 11 connect with equipment as indicated in the drawing. The specimen wiring shown in Fig. 11*a* in connection with the marker leads 1H, 2H . . . OH are respectively for re-set or digit absorption (1H connected with RC) for marking local calls and for prefix numbers identifying, e. g., pay stations (2H interconnected with 9H); and overflow signal and unassigned prefix numbers (3H interconnected with 4H through 8H).

The marker is common to all links in a 100-line board. It is seized for an instant by a link after the prefix, tens or units digit is dialled and immediately released again for use by other links. On each seizure the link furnishes information to the marker indicating the digit and numeral dialled. In response the marker causes the required selections to be made in the link by way of the connector-allotter bank of the links.

A guard circuit provided in the links insures that only one link at a time can seize the marker. This guard circuit is divided into two sections, each serving one half of the links, so that trouble in one half will not affect service in the other half.

To seize the marker, a link in the first half connects ground through its guard relays over lead GS to marker lead GS1 which obtains battery from relay GA through lead GA and leads GI–GO of all links in the first half, and lead GO1. The guard relays in the link cannot operate through the high-resistance right-hand winding of GA, but GA operates and furnishes battery through its low-resistance left-hand winding which allows the guard relays in the link to operate. These relays lock to lead GI and open lead GO, removing battery from lead GS. At the same time GA disconnects battery through GB from lead GB which serves the links in the second half.

A link in the second half operates GB in a similar manner over leads GS2, GO2 and GB. Operation of GB disconnects battery from lead GA and thereby from the links in the first half. In this manner one half disconnects battery from the other, to insure that only one link at a time can seize the marker. Should both halves attempt to seize the marker at the same instant, GA and GB will both operate, but GA opens both windings of GB and releases GB, while GB opens only the high-resistance right-hand winding of GA, allowing GA to hold over its low-resistance left-hand winding.

To make a prefix selection the link, through its guard relays, applies ground to lead SN and connects the leads P1 and P2 to contacts of the counting relays which indicate the dialled number. Ground on SN operates SA, SB and GM. Operation of GM connects relays N1–N8 to leads P1–P2 and ground. N1–N8 read the dialled number as explained with reference to Figs. 1–7 and apply ground to the corresponding lead 1H–0H through SA, SB. N4–N7 operate GR which opens leads GS1 and GS2. With SA, GM, GR operated, the 280-ohm winding of GS is connected to battery through 250 ohms and over lead RC to ground through 250 ohms in the link. The other end of this winding is also connected in the marker to ground through 250 ohms and to battery through 250 ohms. This applies the same voltage (24 volts) to both ends of the winding so that GS does not operate.

In the example shown in Figs. 11–11*a*, dialling the number 2 operates N1, N3, N4, N5, N6 (see also Fig. 1*a*), thereby applying ground to lead 2H which is connected to marker lead HSA and link lead HS. Ground on HS operates relay S in the link, marking a local call. SA connects ground on HSA to lead RC through a rectifier. This approximates direct ground on RC and therefore on one end of GS, causing GS to operate in parallel with 250 ohms to ground. GS releases SA, SB and GM. With GR operated, the release of GM opens leads SN, GA, GB, P1, P2. This releases the link guard relays GA or GB, GS and N1–N8. Release of N4–N7 restores GR, which re-closes leads SN, GA, GB, GS1, GS2 and thereby restores the marker to normal, ready for the next selection.

Any desired prefix number may be used to identify pay stations; for example, if lead 9H is connected to 2H as shown, dialling prefix 9 has the same results as dialling 2.

SB applies ground to lead FCM for operating a suitable finder call meter (not shown) to register originating calls.

For a tens selection the link first operates GA or GB, and then, through its guard relays, applies ground to lead TN and indicates the dialled number overleads P1 and P2. Ground on TN operates TA, TB and GM. GM closes the circuits of N1–N8, which operate in accordance with the dialled number, apply ground over leads 10–00 to the corresponding tens bar in the connector-allotter bank through TA.TB, and operate GR. Relays TA, GM, GR close circuits for GS as described above. TA places ground on lead AC which operates the connector-allotter coil. The ground on one of the leads 10–00 (Fig. 11*a*) then operates the connector tens coil indicated by the dialled number. This coil locks and thereby extends its direct operating ground to lead RC. Direct ground on RC indicates that the tens coil has operated and initiates the release of the marker by operating GS. Relay GS releases TA, TB, GM, which restores GS, N1–N8 and then GR as described above.

The units selection is similar to the tens selection, except that the link applies ground to lead UN. This operates UA, UB, GM and thereby applies ground over leads 1–0 (Fig. 11*a*) to the indicated units bar in the connector-allotter bank. Moreover, lead RC is connected to battery, not through 250 ohms in the marker, but through the operated 200-ohm tens coil of the connector switch, as will be presently described. This is sufficient to prevent operation of GS until the selected units coil operates and extends its direct operating ground over its locking contact to lead RC.

The prefix selection for trunks is similar to the prefix selection for local calls described above. Relays SA, SB, GM, N1–N8 operate and, for example, apply ground to lead 0H when the number 0 is dialled. Ground on 0H operates a trunk control circuit.

The trunk control circuit for trunks terminated on lines applies ground to leads ACA and LDB and, in the connector-allotter bank, to a tens bar and a units bar corresponding to an idle trunk. This operates the allotter coil in the connector over lead AC, and then the tens coil and units coil required to select the chosen trunk. The two coils lock and extend their direct operating ground to lead RC, causing GS to operate. GS connects the ground on LDB to lead LD, thereby operating link relay L, and then releases the marker as described. This in turn restores the trunk control circuit to normal.

The trunk control circuit for trunks terminated on switches applies ground to lead RF, and over lead AFA to AF, causing functions which are explained in the link and trunk descriptions. After an idle trunk switch has picked up the calling line, it applies ground over lead LDA and a resistance to lead LD. This operates link relay L which applies direct ground over its locking circuit to LD. Direct ground on LD, like direct ground on HS, operates GS and thereby releases the marker as previously described.

On incoming calls from the distant office, trunks terminated on switches make use of the marker in the same manner as the links.

If all trunks, terminated either on lines or on switches, in the called group are busy, the trunk control circuit applies ground to lead MRA, but to no other leads. Ground on MRA is connected by SA to lead MR and causes relay U in the link U to operate to give an overflow signal, as will be described later on. At the same time, this ground operates GS through its 120-ohm winding, which releases the marker and the trunk control circuit.

To absorb a false preliminary pulse, lead 1H is connected to lead RC. Dialling the number 1 or receipt of a false pulse then places direct ground through 1H on RC, which operates GS and thereby releases GM. This opens leads SN, GA, GB, P1, P2 as described, disconnecting battery from lead GI and releasing the link guard relays as well as the marker.

Where universal directory numbering for a group of offices is required, the number leads of other prefix digits may be connected to lead RC, the same as 1H, to absorb these numbers.

As soon as the marker is seized, relay GA or GB operates and shunts relay GD. On normal selections GA or GB does not operate long enough to let GD release. However, if for any reason the selection is not completed, GA or GB remains operated longer than the normal time and causes GD to release. GD then applies ground to lead MR to operate link relay U which opens the circuit of the guard relays in the link and thereby disconnects the link from the marker. GD also operates GS through its 120-ohm winding. Operation of GS releases the marker, including GA or GB, which lets GD operate again.

For unassigned prefix numbers, the corresponding number leads are connected to lead MRA, for example, 3H–8H as shown on Fig. 11*a*. Dialling one of these numbers then places ground on lead MRA which causes the functions described in connection with the overflow signal.

The circuits next to be described are the circuits relating to the

*Selector marker and selector control, Figs. 12–13*

These circuits are provided in every 100-line bay, e. g., if 100-line boards are to be expanded to a selector system. The selector marker and selector control are common to all finder-selector links in the bay.

The leads LD, MR . . . P1, P2 on top of Fig. 12 connect with similarly marked terminals at the bottom of the link circuit, Figs. 16 and 17. The leads RS, FI, FO . . . FI, FO on top of Fig. 13 connect with similarly marked connector terminals shown at the bottom left of Fig. 14. The terminals CBA and CBB at the top of Fig. 13 may be connected with an all-connector-busy meter (not shown). The terminals COM and CCM in Fig. 13 may be respectively connected with a connector overflow meter.

The connection shown in Figs. 12 and 13 are for 200-group connectors using relays ST2.SU2 and selector bank numbers 21–29, 20 and 11–15. The terminals marked "0" and "8" (lower right-hand corner of Fig. 12) lead to ST.SU relays assigned to trunk groups. The terminals 1, 2, 3, 4, 5 from contacts 1, 3, 5, 11, 13 of relay SUA and the terminals 6, 7, 8, 9, 0 from contacts 1, 3, 5, 11, 13 of relay SUB (bottom of Fig. 13) are wired to the selector-allotter bank and to terminals of the selector units control relays.

The marker is seized by the link for an instant after the prefix digit is dialled and is immediately released again for use by other links. During this interval the link indicates the dialled number to the marker, and the marker directs the selector switch of the link by way of the selector control and selector-allotter bank, to select an idle connector in the desired hundred group.

To prevent interference, the selector control defers calls from other hundreds to the called hundred for a moment and attaches the selector-allotter bank for an instant to circuits in the called hundred, which mark an idle connector in that group.

A 100-line bay mounts 15 connectors which may be reached over 15 selector bank outlets: for example, the 15 connectors of the 200 group may be assigned to selector bank Nos. 21–29, 20 and 11–15. Connectors 1–5 place ground over their leads XT on lead XA as long as they are idle; connectors 6–10 on lead XB; and connectors 11–15 on lead XC; operating relays XA, XB, XC. With XS normal, XA applies ground to lead HU1—U1. If connectors 1–5 are busy, XB places ground on HU2—U2; and with connectors 1–10 busy, XC connects ground to HU3—U1 and to HT1—HT. These grounds mark idle connectors in sets of five, for example:

| Connectors | Ground on Leads | Selector Bank Nos. |
|---|---|---|
| 1–5 | —=20 U1=1–5 | 21–25 |
| 6–10 | —=20 U2=6–0 | 26–20 |
| 11–15 | HT=10 U1=1–5 | 11–15 |

To mark the first idle connector in a set of five, temporary ground is applied to its lead XU. As shown, leads XU of connectors 1, 6, 11 are connected to lead 16; of connectors 2, 7, 12 to lead 27; and so forth. If, for example, connector 1 is idle, it is marked by grounds on U1 and 16; connector 9 would be marked by U2 and 49; connector 13 by HT, U1 and 38.

A guard circuit provided in the links insures that only one link at a time can seize the marker. This guard circuit is divided into two sections, each serving one-half of the links, as already described in connection with the link member Figs. 11–11*a*, so that trouble in one half will not affect service in the other half.

To seize the marker, a link in the first half connects ground through its guard relays over lead GS to marker lead GS1 which obtains battery from relay GA, through lead GA and leads GI—GO of all links in the first half, and lead GO1. The guard relays in the link cannot operate through the 3800-ohm winding of GA, but GA operates and furnishes battery through its 85-ohm winding which allows the guard relays in the link to operate. These relays lock to lead GI and open lead GO, removing battery from lead GS. At the same time GA disconnects battery through GB from lead GB which serves the links in the second half.

A link in the second half operates GB in a similar manner over leads GS2, GO2 and GB. Operation of GB disconnects battery from lead GA and thereby from the links in the first half. In this manner one half disconnects battery from the other, to insure that only one link at a time can seize the marker. Should both halves attempt to seize the marker at the same instant, GA and GB will both operate, but GA opens both windings of GB and releases GB, while GB opens only the 3800-ohm winding of GA, allowing GA to hold over its 85-ohm winding.

To make a prefix selection, the link guard relays apply ground to lead SN and connect marker leads P1–P2 to contacts of the counting relays which indicate the dialled number. Ground on SN operates GM which connects relays N1–N8 to leads P1–P2 and ground on SN. Relays N1–N8 read the dialled number, as expalined in connection with Figs. 1–7, and apply ground to the corresponding lead 1H–0H. Relays N4–N7 operate GR which opens leads GS1 and GS2. With GM and GR operated, the winding of GS is connected to battery through 250 ohms and over lead RC to ground through 250 ohms in the link. The other end of the winding is also connected in the marker to battery through 250 ohms and to ground through 250 ohms. This applies the same voltage (24 volts) to both ends of the winding so that GS does not operate at this time.

Ground on one of the leads 1H–0H, for example, 2H, operates the associated relays ST2 and SU2 in the selector tens and units control of the calling hundred. ST2 connects one winding of STA to ground and the opposing winding together with STB to lead HT. With no ground on HT, the opposing windings of STA and STB received no current, so that only STA operates. STA applies ground through ST2 to terminal B2 which is strapped through A2 to selector-allotter bar 20. Relay SU2 connects one winding of AB to its own operating ground and the opposing winding of AB through SUA and SUB to leads U1 and U2. Ground on U1 operates SUA, but prevents operation of AB by energizing its opposing winding.

ST2 also connects SG to guard lead HG of the 200 group. This guard lead HG is multipled to the selector controls of all hundreds and receives battery through relay CM of the called hundred. This battery through 151.8 ohms on lead HG operates SG over its 570-ohm winding, and SG connects a 3-ohm ground through its other winding and SH to lead HG. The 3-ohm ground reduces the voltage on lead HG to less than 1 volt and prevents operation of SG in other selector controls. This defers other calls to this hundred for a moment, but has no effect whatever on calls to other hundreds which use different guard leads HG and are free to go through at the same time. Meanwhile SG holds and SH operates. SH places ground through ST2 over D2–E1 on marker lead HSA and ground over lead ACA on link lead AC to operate the selector-allotter coil of the link. CM also operates and registers the call to this hundred over lead CCM on a connector call meter.

SH also places ground through ST2, HF and XS over 1FI on lead FI of the first connector. This ground on FI causes the first idle connector to apply ground to its lead XU, for example, connector 1 over XU to lead 16 which is connected by SU2 and SUA to selector-allotter bar 1. The grounds on allotter bars 20 and 1 operate the corresponding coils in the selector switch of the calling link, thereby connecting it to connector 1 of the 200 group through selector bank No. 21.

If ST2.SU2 find ground on leads U2 and 49, operation of STA applies ground to selector-allotter bar 20 and ground on U2 operates SUB which connects ground on 49 to selector-allotter bar 9, thus selecting connector 9 through selector bank No. 29. With grounds on HT, U1 and 38, operation of ST2 connects ground on HT to the opposing winding of STA and to STB, operating STB but not STA, and STB applies ground through ST2 to terminal C2 which is strapped through A1 to selector-allotter bar 10. Ground on U1 operates SUA which connects ground on lead 38 to selector-allotter bar 3. This selects connector 13 through selector bank No. 13.

Relays ST1, ST3–ST0 and SU1, SU3, SU0 are provided for reaching other hundreds or trunks when the corresponding prefix number is dialled.

When the selector tens coil and units coil operate as described above, they extend their direct operating ground to marker lead RC, which connects direct ground to one end of GS and causes GS to operate in parallel with 250 ohms to ground. GS connects ground placed on lead HSA by SH to link lead HS, operating link relay S. Lead SN is opened by GS, causing GM to release. With GR operated, the release of GM opens leads GA, GB, P1, P2 and 2H. This releases the link guard relays, GA or GB, N1–N8, ST2 and SU2. Release of ST2, SU2 restores STA, SUA and removes ground from leads HSA, AC, HG, HF—1FI—FI; and thus releases CM, SG, SH. This frees the 200 group for the next call. Release of N4–N7 restores GR which re-closes leads SN, GA, GB, GS1, GS2 and thereby restores the marker to normal, ready for the next call.

Idle trunks are marked like idle connectors by a trunk control circuit similar to relays XA—XC, and the selector marker and control connect the calling link through its selector switch to an idle trunk as explained above, with one exception. If, for example, ST1, SU1 are used for a trunk group, SH places ground through ST1 on terminal D1 which is strapped to E10 for trunks. This places ground over lead LDA through GS on link lead LD and operates link relay L instead of S.

If more than fifteen trunks are required in a group, trunks 16–20 may be marked by ground on HT and U2, which operates STB and SUB as described above.

If all connectors or trunks in the called group are busy, relays XA, XB, XC are all normal, which removes ground from HT and U2, and connects U1 to ground through the 5000-ohm relay OM. With ground through 5000 ohms on U1, relay SUA and the opposing winding of AB receive insufficient current when, for example, ST2, SU2 operate. This lets AB operate over its other winding. AB operates marker relay AB which places ground on link lead MR to operate link relay U. The latter releases the link guard relays and GA or GB, which in turn releases the selector marker and control. Relay OM operates in series with relays SUA and AB, and registers the call over lead COM on a connector overflow meter.

For unassigned prefix numbers, the corresponding number leads are connected to lead MR, for example, 4H–7H, as shown in Fig. 12. Dialling one of these numbers as the prefix digit then places ground on lead MR which operates link relay U as described above.

To absorb a false preliminary pulse, lead 1H is connected to lead RC. Dialling the prefix 1 or receipt of a false pulse then places direct ground through 1H on RC, which operates GS and thereby releases GM. This opens leads SN, GA, GB, P1, P2 as described, disconnecting battery from lead GI and releasing the link guard relays as well as the marker.

Where universal directory numbering for a group of offices is required, the number leads of other prefix digits may be connected to lead RC, the same as 1H, to absorb these numbers.

As soon as the marker is seized, relay GA or GB operates and shunts relay GD. On normal selections, GA or GB does not operate long enough to let GD release. However, if for any reason the selection is not completed, GA or GB remains operated longer than the normal time and causes GD to release. GD then short-circuits GM and applies ground to lead MR to operate link relay U, which opens the circuit of the guard relays in the link and thereby disconnects the link from the marker. Release of GM restores the marker, including GA, or GB, which lets GD operate again.

In case the selector switch functions properly, but link relay S fails to operate or lock, dialling the next digit operates GA or GB and GM as described. As soon as GM operates, GS receives battery through the 200-ohm tens coil and the 500-ohm units coil of the selector as well as ground through 250 ohms over lead RC from the link. This battery on RC operates GS before the selector control can function. GS releases GM which restores the link guard relays and the marker, so that no new selection in addition to the original selection can be made in the selector switch.

With XS normal, ground placed by a call on lead HF is carried through 1FI and XS to lead FI of the first connector in the called group. At the same time this ground operates XR through a rectifier. When ground is removed again from HF by the release of the selector control, XS operates in series with XR; shifts the circuit of HF over 2FI to lead FI of connector 6; and changes the circuits of HU1–HU3 and HT1 so as to mark connector 6 as the first choice. Ground applied to HF by the next call holds XS and releases XR by energizing its opposing winding. Removal of ground from HF then releases XS, which shifts the first choice back to the first connector. These functions are repeated on succeeding calls, shifting the circuit of HF from connector 1 to connector 6 and back again on alternate calls. As a result, service will be maintained in case the FI—FO chain of the connectors should become open at any point.

In contrast to step-by-step systems, the selector bank outlets for any connector or trunk group are not limited to ten and need not be consecutive. For example, five 100-line groups, each having fifteen connectors, may be assigned to the selector bank as follows:

200 group=selector bank Nos. 21–20, 11–15
300 group=selector bank Nos. 31–30, 16–10
400 group=selector bank Nos. 41–40, 81–85
500 group=selector bank Nos. 51–50, 76–70
600 group=selector bank Nos. 61–60, 71–75

The remaining 25 outlets are available for trunks and may be split into a number of trunk groups as required.

Where the total number of the required connectors plus the trunks exceeds the 100 available selector outlets, the selectors are divided into groups, each of which has access to a sufficient number of connectors and trunks, but not to all of them. To make up for the slightly lower efficiency of a graded group, the standard 100-line bay provides space for adding a sixteenth connector.

The circuit to be described next is the circuit showing the

*Connector with marker, Fig. 14*

The connector is shown in the upper part of Fig. 14, above the faint broken line. The marker is shown in the lower part of Fig. 14.

The connector is reached from a link through the selector switch. Its function is to extend the connection from the link to the called line in the selected 100-line group. All other control functions, such as pulse counting, busy test, ringing, etc., are performed by the link. The connector comprises a connector switch having four relays.

The marker is common to all connectors in a 100-line group. It is seized for an instant by a connector after the tens or units digit is dialled in the link and immediately released again for use by other connectors. On each seizure the link, through the selector switch, the link furnishes information to the marker indicating the number dialled. In response the marker causes the required selection to be made in the connector switch by way of the connector-allotter bank.

When a connector is engaged, X releases as described in the next following paragraph with reference to the landing of a call. This transfers subsequent calls to other connectors. After all connectors have been engaged one after the other, all relays X are normal, which removes ground from leads XT. This causes a common re-set circuit to apply ground to lead RS which operates and locks X in every idle connector in the group; the locking ground is blocked from lead RS by a rectifier. Operation of X places ground on lead XT and prepares the connector for accepting a call. Blowing of the connector fuse or opening busy switch SW also prevents operation of X and makes the connector busy.

To seize an idle connector in the called 100-line group, the selector marker applies ground to lead FI through the selector control. Ground on FI holds X and operates A in the first idle connector. A lights lamp BL; opens the locking circuit of X; and applies ground to lead XU. Ground on the two leads XT and XU marks the connector seized for the call and causes the selector switch of the calling link to connect the link to this connector. The selector marker and control then release, removing ground from FI. This releases X which opens ground on XT and XU and transfers the circuit of lead FI over FO to lead FI of the next connector, so that subsequent calls are transferred to other connectors. With X normal, A is held over the + line of the selector by battery from the link relay bar.

To make a tens selection, the link (Figs. 15–17) connects ground through its relay H over the — line of the selector switch through A and G to lead GS1 over a circuit from —S A.m17 X.b12 A.wi X.b6 G.w RX GS—GS1

If the marker happens to be busy at the moment, there is no battery on lead GS1 and the link waits until the marker becomes available.

When the marker is free, the ground placed on lead GS1 operates GA through its left-hand winding. GA disconnects battery through GB from lead GB and applies battery through its right-hand winding to lead GA—GI which holds A and lets connector relay G and link relay H operate. G locks to battery on lead GA—GI and opens the battery circuit from lead GI to lead GO and through GI—GO of other connectors to GS1. Rectifier RX blocks the locking battery of G from lead GS1.

Removal of battery from leads GS1 and GB prevents operation of G in any other connector and thereby insures that only one connector at a time can seize the marker for making a selection. Connectors 1–4 and 9–12 operate GA over leads GS1—GA, while connectors 5–8 and 13–16 operate GB in a similar manner over leads GS2—GB and remove battery from GS2 and GA. Dividing the guard circuit in two sections insures that trouble in the GI—GO chain of one section will not affect service in the other section.

Operation of G connects selector test wire TS to marker lead P1; transfers the + line from relay A to marker lead P2; and operates TA—TB and GM over lead TN. Operation of GM connects relays N1–N8 to ground and over leads P1–P2 through TS and + S and the selector switch to contacts of the counting relays in the link which indicate the dialled number. N1–N8 read the dialled number, as explained in connection with Figs. 1–7, and apply ground through TA—TB to the corresponding tens allotter bar. N4–N7 operate GR which opens leads GS1–GS2. TA locks TA–TB over lead TNA and operates the connector-allotter coil AR over lead AC. TB opens UA—UB. With TA, GM, GR operated, the 280-ohm winding of GS is connected to battery through 250 ohms and over lead RC to ground through 250 ohms in the connector. The other end of this winding is also connected in the marker to battery through 250 ohms and to ground through 250 ohms. This applies the same voltage (24 volts) to both ends of the winding so that GS does not operate at this time.

Ground applied by N1–N8 to one of the allotter bars 10–00 operates the connector tens coil indicated by the dialled number. The tens coil locks and extends its direct operating ground to relay U which operates. U locks itself and the tens coil and extends this direct operating ground over lead RC to one end of GS, causing GS to operate in parallel with 250 ohms to ground. U also transfers ground from lead TN to UN, but TA—TB have locked and opened lead UN so that this transfer has no effect.

Operation of GS releases TA—TB and GM. Release of TA restores AR. With GR operated, the release of GM opens leads GA, GB, P1, P2, RC and holds UN open. This releases link relay H, connector relay G and marker relays GA or GB, GS and N1–N8. Release of N4–N7 restores GR which recloses leads TN, UN, GA, GB, GS1, GS2 and thereby restores the marker to normal, ready for the next call. After G releases, A holds again over the + line of the selector from battery in the link.

The units selection is similar to the tens selection, except that U is operated, so that G operates UA—UB and GM over lead UN. This applies ground over leads 1–0 to the indicated units allotter bar. Moreover, lead RC is connected to battery, not through 250 ohms in the marker, but through the operated 200-ohm tens coil and through the 900-ohm relay U. This is sufficient to prevent operation of GS until the connector units coil operates and extends its direct operating ground over its locking contact to lead RC.

If the called line is idle, relay A holds the + line and — line of the connector switch open and connects lead TC of the link through the selector switch, lead TS and the connector switch to test wire T of the called line. This enables the link to make the busy test after the party digit is dialled. If the line is free, the link applies ground to its lead TC and removes battery from the + line, releasing slow-to-release relay A.

Release of A closes the + line and — line to the connector switch and transfers the circuit of U to ground through lead TS and link lead TC, which holds U. After A releases, U maintains ground on connector lead TC and test wire T of the called line. The connector tens and units coils continue to be held by U, and lamp BL remains lit. The link is now connected through the connector switch to the called line for ringing and talking. Hanging up releases the link and removes ground from its lead TC, restoring U which releases the connector switch and connects X to lead RS.

If the called line is found busy, the link opens its lead TC and maintains battery on the + line which holds A. On a normal call, hanging up releases the link after applying a brief ground pulse to its lead TC to test for reverting call. Release of the link removes battery from the + line which restores A and thereby releases U and the connector switch.

On a reverting call, the test ground placed on lead TC causes the link to hold and to remove battery from the + line which cuts the link through to the connector switch, as described above in connection with the operations that occur when the called line is found idle.

For vertification on a trunk call, the trunk circuit removes battery from the − line and maintains ground over the selector switch on lead TS. This releases A which cuts the + line and − line through, while ground on lead TS holds U and the connector switch.

As soon as the marker is seized, relay GA or GB operates and shunts slow-to-release relay GD. On normal selections, GA or GB does not operate long enough to let GD release. However, if for any reason the selection is not completed, GA or GB remains operated longer than the normal time and causes GD to release. GD then applies direct ground to leads MR—RC which operates GS. Operation of GS releases link relay H, connector relay G and the marker as explained before in connection with the tens selection. The 120-ohm winding of GS is provided for use in 100-line boards.

Next to be described is an embodiment of a:

*CAX-link, Figs. 15, 16 and 17*

This link may be used in a 100-line or in a selector board. In a 100-line board the link establishes the connection from the calling line to the called line. It comprises, first, a finder switch (left in Fig. 15) which makes connection to a calling line under the control of the line relay by way of the tens and units guard, as described in connection with Figs. 8, 9 and 10; second, 20 relays, as shown in Figs. 15–17, which receive the dial pulses and perform all necessary control functions; and, third, a connector switch, as described in connection with Fig. 14 (diagrammatically shown at the right of Fig. 17) which selects the called line under the control of the link by way of the associated marker (also shown in Fig. 14). A selector switch may be interposed between the connector and the link. The link is standardized to provide for all service requirements normally encountered in community dial boards. As stated in the preamble, the same switchboard bay serves for 100-line boards and for selector boards. It includes mounting space and wiring provisions for selector switches and other necessary selector equipment.

Each finder (left in Fig. 15) and each connector switch (right in Fig. 17) can reach any one of 100 three-conductor lines over 300 bank multiple bars. As already stated, these switches may be of the type as disclosed in Patent No. 2,573,889 mentioned before. Each switch comprises 10 tens magnets or coils (see "10" in Figs. 15 and 17), 10 units coils (see "1" in Figs. 15 and 17), and one allotter coil (see "AR" in Figs. 15 and 17). Operation of a tens coil selects 10 of the 100 lines, and operation of a units coil selects one of these 10 lines. The allotter coil AR is operated to connect the 10 tens and the 10 units coils to 20 allotter bank bars over which these coils are energized as required, to make the desired selection. Finder and connector switches have a common line bank, but use separate allotter bars in this bank at the bottom of Fig. 16, and Fig. 17 connect with similarly marked terminals in the previously discussed marker circuits. Some of these terminals go through other links in the same group. GO of odd No. links go to G1 of next odd No. link. GO of even No. links go to G1 of next even No. link. The terminals R17—R39 and RS2—R11 (top and bottom of Fig. 16) connect with the ringing interrupter which supplies ringing frequencies for party line ringing. The terminals 15P and 15N and also ODN—ODP (top of Fig. 16) also connect with the ringing interrupter, 15P to ring party Nos. 1–5 on + line; 15N to ring party Nos. 1–5 on − line; ODP to ring odd party Nos. on + line; and ODN to ring odd party Nos. on − line. The terminals BT, OT, DT supply, respectively, busy, overflow and dial tone from a suitable interrupter. Terminals TD and WT (top right of Fig. 16) supply ground from a power panel (not shown). The terminal RR (top left of Fig. 17, next to relay T) connects to ringing ground at the power panel. In a 100-line board, jumpers "C" (top right and middle of Fig. 17) are provided for the connector, and in a selector board jumpers "S" are provided for the selector, as shown. The conductors at the lower right of Fig. 15 go to the finder-allotter bank and to the tens and units guard, as marked.

The operations of the link are for 100-line boards and for selector boards, in the principal phases, practically identical. They will be described for a 100-line board.

Local stations normally have four-digit numbers, the first (prefix) digit marking a local call; the second and third (tens and units) digits selecting the line; and the fourth (party) digit selecting the party on the line.

The functions of the 20 link relays shown in Figs. 15–17 will be apparent from the following table:

| | |
|---|---|
| X | normally operated shift relay; releases to make the link busy; |
| A | battery feed relay for calling line; receives dial pulses; |
| B | slow-to-release hold relay; holds link under control of A; |
| C | selection control relay; releases after dial pulses stop; |
| D | battery feed relay for called line; gives answer supervision; |
| E | busy test relay; connects through to called line; starts ringing; |
| F | ringing relay; connects ringing current to called line; |
| G | guard relay; seizes marker; prevents marker seizure by other links; |
| H | operates with guard relay to transmit dialled number to marker; |
| K | timing relay for lockout and disconnect timing; |
| L | trunk relay; cuts link thru to trunks; releases reverting call; |
| R | controls release of counting relays; reverses ring; times disconnect; |
| S | operates for tens and units selection; applies disconnect tone; |
| T | operates for tens, units and party selection; trips ring; |
| U | operates for units and party selection; applies overflow busy tone; |
| 1–5 | counting relays for dial pulses; control selections and ringing. |

Incoming calls engage the links in rotation. The order of rotation is indicated on the circuit of the tens and units guard, as described before in connection with Figs. 8–10. Seizure of a link releases its relay X as explained later on. After all links have been engaged, all relays X are normal, which removes ground from lead RT. This causes a reset circuit to apply ground to lead RS, which operates in every idle link: (100, 1.b7, 3.b5, 5.b5, T.b12, U.b12, B.b17, C.b8, D.b17, L.b14, X.wo, rect., RS.) Relay X locks to ground, places ground on RT, and prepares the link to accept a call. A rectifier blocks the locking ground of X from lead RS. The next incoming call is then accepted by the first link in which X is operated.

Each link has its own fuse. When this fuse blows, X cannot operate, making the link busy until the fuse is replaced. Opening busy switch BY—SW also prevents operation of X and makes the link busy.

When a call comes in (X operated), the line relay of the calling line operates relays in the tens and units guard (Figs. 8–10) which apply ground to lead FI and to a tens bar and a units bar in the finder-allotter bank, identifying the calling line number. Ground on FI operates finder-allotter coil AR and relay C: (FI, X.m5, ARF, AR and FI X.wi, X.m2, C.wi.) The locking circuit of X is opened by C, but X holds temporarily in series with C from ground on FI.

AR connects the 10 tens coils and the 10 units coils of the finder switch to the finder-allotter bank. The two grounds identifying the calling line then operate the finder tens coil and units coil required to select the calling line. Operation of these coils connects the calling line through the finder switch to leads +F −F TF.

This operates relay A from battery through the cut-off relay in the line circuit over test wire T and lead TF. Relay C also applies battery to lead TF and A over: (100, 1.b7, 3.b5, 5.b5, T.b12, U.b12, B.b17, C.m8, X.m12, A.wi.) This battery is not sufficient to operate A by itself, but speeds up the operation of a A from battery in the line circuit. If the battery from the line circuit is open due to trouble in the line circuit or finder switch, A cannot operate, and the tens and units guard opens ground on FI after a predetermined delay. This releases the finder, X and C, and makes the link busy.

Relay A locks temporarily (X.m14) and operates B, which applies ground to finder locking lead LKF, locking the operated tens and units coils. B also connects ground over lead TF to test wire T of the calling line, supplying direct ground to its cutoff relay which has already started to operate in series with relay A. Operation of the cutoff relay releases the tens and units guard, which removes ground from lead FI and from the allotter bars. This releases AR and X. Release of X opens ground on RT and transfers the circuit of lead FI over lead FO to lead FI of the next link, so that subsequent calls are transferred to other links.

C is held operated by B (K.b15, B.m4, TF, X.b12, L.b8, E.b2, C.wo, B.m17, U.b12, T.b12, 5.b5, 3.b5, 1.b7) and connects dial tone from lead DT to the line (DT, R.b12, C.m5, T.b17, E.b8, F.b15). Lamp BL lights from ground on lead TF after X releases. With X normal, the locking circuit of relay A is opened, and A is connected over the finder switch to the calling line (A.wi, B.m11, D.b2, L.b2, loop, L.b5, D.b5, B.m14, A.wo), ready to receive dial pulses.

On dialling a prefix digit in a local call, A, B, C, are operated. Each dial pulse releases A briefly, and the dial pulses are counted by relays 1–5, as explained with reference to Figs. 1–7. The corresponding circuits are. K.b15, B.m4, TF, X.b12, L.b8, Ab.12, C.m2, 2.bm7, pulse; K.b15, B.m4, TF, L.b8, D.b14, R.b8, lock, 1–5. During pulsing B holds due to its slow-to-release coil. 1–5 open the original circuit of C, but C is slow to release and is held by the pulses: K.b15, B.m4, TF, X.b12, L.b8, A.b12, C.m2, X.b2, C.wi. Operation of 2–5 closes a circuit for S, T and U through a rectifier which prevents their operation at this time: K.b15, 2.m1, 3.m18, 4.m8, 5.m18, C.m12, S.wi, rect., U.wi, S.b15, T.wo.

When pulsing stops, A remains operated long enough to let C release, which opens dial tone. With 1–5 operated according to the dialled number, release of C connects G and H from ground to lead GS: K.b15, 2.m1, 3.m18, 4.m8, 5.m18, C.b12, S.b12, U.b2, E.b12, H.wi, G.w, rect., GS. If the marker happens to be busy at the moment, there is no battery on lead GS, and the link waits until the marker becomes available. When the marker is free, battery is found on lead GS, so that G and H operate. G locks G and H to battery on lead GI and opens the battery circuit from lead GI to lead GO and through GI—GO of all succeeding links to lead GS. A rectifier blocks the locking battery of G from lead GS.

Removal of battery from lead GS prevents operation of G and H in any other link and thereby insures that only one link at a time can seize the marker for making a selection. Should two or more links attempt to seize the marker at the same instant, only the link nearest the battery in the GI—GO circuit will succeed. The other links are prevented from completing the operation of G and H as soon as G in the first link opens the circuit from GI to GO. These links then wait until the marker is free again.

H operates R which locks (K.b15, B.m4, TF, X.b12, L.b8, F.b18, H.m14 or R.m16, R.wo). With R operated, 1–5 are held by H: (K.b15, B.m4, TF, X.b12, L.b8, D.b14, H.m12, lock, 1–5). H also applies ground to lead SN which informs the marker that a prefix selection is to be made. At the same time H connects marker leads P1 and P2 to contacts of relays 2–5 which indicate the dialled number: (P1, S.b4, H.m1, 5.m16, etc., P2, S.b18, H.m3, 3.b2, etc.). The marker reads this number as explained in connection with Figs. 1–7 and makes the selection indicated by the dialled number.

If the dialled number indicates a local call, the marker responds by applying ground to lead HS. Ground on HS operates S which locks: (K.b15, B.m4, TF, X.b12, L.b8, U.b14, S.m8, S.wo). The marker then opens battery on lead GI, releasing G and H. This disconnects the link from the marker and releases 1–5, which lets C operate again over the previously traced circuit. Dial tone is held open by R. The link is now ready to receive the tens digit.

Relays A.B.C.R.S are operated when the tens digit is dialled. The dialled number is again recorded on relays 1–5. The first pulse energizes the opposing winding of R (K.b15, B.m4, TF, X.b12, L.b8, A.b12, C.m2, R.m18, F.b4, R.wi). This releases R which re-closes the locking circuit of 1–5. Operation of 2 after the first pulse causes T to operate (K.b15, 2.m1, 3.m18, 4.m8, 5.m18, C.m12, S.m15, T.wo). Relay T prepares a circuit for U and S (K.b15, T.m1, C.m15, U.wi, rect., S.wi, S.m15, T.wo), but the operating ground of T shunts U and S at this time.

When pulsing stops, C releases, opening the original circuit of T, but T holds over another new circuit: K.b15, T.m1, C.b15, S.m15, T.wo. Release of C also connects G and H to lead GS: K.b15, 2.m1, 3.m18, 4.m8, 5.m18, C.b12, S.m12, H.wo, M2—M1, G.w, rect., GS. If the marker is free, G and H operate and connect the link to the marker as described above. H operates R (K.b15, B.m4, TF, X.b12, L.b8, F.b18, H.m14 or R.m16, R.wo), holds 1–5 (K.b15, B.m4, TF, X.b12, L.b8, D.b14, H.m12, lock, 1–5) and with T operated applies ground to lead TN which informs the marker that a tens selection is to be made.

The marker reads the dialled number recorded on relays 2–5 over leads P1 and P2 (P1—M3, S.m4, H.m1, 5.m16, etc., P2—M4, S.m18, H.m3, 3.b2, etc.), applies ground to lead AC to operate the allotter coil of the connector switch and operates the connector tens coil indicated by the dialled number by applying ground to the corresponding tens bars in the connector-allotter bank. The tens coil locks over lead LKC to ground through 250 ohms and extends its direct operating ground over lead RC to the marker. This direct ground on RC informs the marker that the tens coil has been operated, and the marker responds by opening battery on lead GI. This releases G, H and the marker, restoring AR. Release of H restores 1–5 and thereby lets C operate again (K.b15, B.m4, TF, X.b12, L.b8, E.b2, C.wo, T.m12, 5.b5, 3.b5, 1.b7), which operates U and holds S and T (A.wi, B.m11, D.b2, L.b2, loop, L.b5, D.b5, B.m14, A.wo). U locks (K.b15, B.m4, TF, X.b12, L.b8, U.m14, B.m7, U.wo) and opens the original locking circuit of S. The link is now ready to receive the units digit.

Relays A.B.C.R.S.T.U are operated when the units digit is dialled. The dial pulses again release R (K.b15, B.m4, TF, X.b12, L.b8, A.b12, C.m2, R.m18, F.b4, R.wi) and operate 1–5. Operation of 2–5 connects direct ground to T (K.b15, 2.m1, 3.m18, 4.m8, 5.m18, C.m12, S.m15, T.wo) which shunts the windings of U and S (K.b15, T.m1, C.m15, U.wi, rect., S.wi, S.m15, T.wo), but U has locked (K.b15, B.m4, TF, X.b12, L.b8, U.m14, B.m7, U.wo), and S holds from the locking ground for 1–5 (K.b15, B.m4, TF, X.b12, L.b8, D.b14, R.b8 or H.m12, rect., S.m8, S.wo).

When pulsing stops, C releases while T holds (K.b15, T.m1, C.b15, S.m15, T.wo). Release of C operates G, H and R as described above for the tens digit. With U operated, H applies ground to lead UN which informs the marker that a unit selection is to be made. The marker reads the dialled number, operates the connector-allotter coil, and applies ground to the allotter units bar indicated by the dialled number. This operates the corresponding units coil in the connector switch, which locks to lead LKC and extends its direct operating ground to lead RC. The marker responds by opening battery on lead GI, releasing G, H and the marker, restoring AR, as described for the tens digit. This restores 1–5 and also S which is being held from the same locking ground (K.b15, B.m4, TF, X.b12, L.b8, D.b14, R.b8 or H.m12, rect., S.m8, S.wo). C then operates again (K.b15, B.m4, TF, X.b18, L.b8, E.b2, C.wo, T.m12, 5.b5, 3.b5, 1.b7) and holds T (K.b15, T.m1, C.m15, S.b15, T.wo). The link is now ready to receive the party digit.

Relays A.B.C.R.T.U. are operated when the party digit is dialled. After R is released and the dialled number recorded on 1–5, pulsing stops and releases C. With T and U operated and S normal, release of C opens the circuit of slow-to-release relay T (K.b15, T.m1, C.m15, S.b15, T.wo) and connects E from ground over lead TC through the connector to test wire T of the called line (K.b15, 2.m1, 3.m18, 4.m8, 5.m18, C.b12, S.b12, U.m2, E.wi, T.m4, TC). Unless the line is busy, E finds battery on this test wire and operates. E. locks (K.b15, B.m4, TF, X.b12, L.b8, E.m2, E.wo); places ground over lead TC on the test wire of the called line to operate its cutoff relay (E.m14); keeps the circuit of C open at E.b2; disconnects busy tone (BT, R.b14, U.m18, C.b5, T.b17, E.b8 or S.m6, F.b15); closes the line over leads +C and −C to the connector; and prepares a circuit for F (100, 1.m7, 3.m5, 5.m5, T.b15, E.m16, F.w, rect., 5.b8, RS1 or 5.m8, RS2).

Slow-to-release relay T releases after holding long enough to let E operate and connects F from battery to ringing start lead RS1, or, if 5 is operated, to lead RS2 (100, 1.m7, 3.m5, 5.m5, T.b15, E.m16, F.w, rect. 5.b8, RS1 or 5.m8, RS2).

With A.B.E.U.1–5 operated, the ringing proceeds as follows: Battery through F stars the ringing interrupter over leads RS1 or RS2. If 5 is normal (parties 1–5), the interrupter operates F by a brief ground pulse applied to lead RS1 at the start of the first ringing period. F locks to ground on lead RH which is opened briefly by the interrupter at the end of the ringing period to release F. A rectifier blocks the locking ground of F from leads RS1 or RS2. If 5 is operated (parties 6–0), F operates during the second ringing period from a ground pulse on lead RS2 and locks to RH.

Operation of F sends out ringing current from the ringing generator lead R17–R56 selected by relays 1–5 to the − line, if R is normal (Pty.1, R17, 4.b15, 1.m15, 3.b8, R.b5, F.m15, E.m8, line, E.m5, F.m12, R.b2, T.wi). Each of the five leads R17–R56 supplies two different ringing frequencies or codes to the links, one during the first ringing period for parties 1–5 and the other during the second period for parties 6–0. Any desired assignment of frequencies or codes to the parties may be obtained by using the proper interrupter.

In order to ring out over the + line, relay R is operated by connecting an interrupter lead NR to one of the four link terminals 15P, 15N, ODP, ODN. To ring parties 1–5 on the − line and parties 6–0 on the + line, the lead is connected to 15N. When parties 1–5 are called, 5 is normal and R does not operate. However, when parties 6–0 are called, 5 is operated, and in this case operation of F connects R to 15N. The interrupter then operates R by ground applied to 15N shortly after the ground pulse on RS1 or RS2, but before ringing current is applied to leads R17–R56 (NR, 15N, 5.m12, F.m4, R.3i). Operation of R reverses the ringing connections in the link, so that ringing current passes out over the + line. The interrupter opens the ground on 15N after disconnecting ringing current from R17–R56, but before removing ground from RH. This releases R before F restores and discharges the ringer condensers on the line to prevent premature operation of D on the discharge. F prevents locking of R by opening its locking circuit (K.b15, B.m4, TF, X.b12, L.b8, F.b18, H.m14 or R.m16, R.wo). While R is operated relays 1–5 are held by E (K.b15, B.m4, TF, X.b12, L.b8, D.b14, S.b2, E.m18, lock, 1–5).

If the interrupter lead NR is connected to 15P, relay R operates when 5 is normal, that is for parties 1–5, and rings these parties over the + line. Connection of NR to ODN causes R to operate when 2 is normal and rings the even party numbers 2, 4, 6, 8, 0 over the + line. With NR connected to ODP, relay R operates when 2 is operated and rings the odd party numbers 1, 3, 5, 7, 9 over the + line.

A small amount of ringing current is passed through a condenser bridging F.b15 to the calling line as a ring-back tone. Using part of the actual ringing current for the ring-back tone makes it possible to check the ringing frequencies or codes from a distant office over a trunk.

If the called party answers during the ringing period with F (or F and R) operated, T is operated by the ringing current (Pty.1, R17, 4.b15, 1.m15, 3.b8, R.b5, F.m15, E.m8, line, E.m5, F.m12, R.b2, T.wi) and releases F (100, 1.m7, 3.m5, 5.m5, T.b15, E.m16, F.w, rect., 5.b8, RS1 or 5.m8, RS2), which in turn restores T. With F released, D operates over the loop of the called line (D.wi, F.b12, E.m5, +C, loop, −C, E.m8, F.b15, D.wo); releases 1–5; and reverses the battery on the calling line for supervision on trunks or pay station lines. If the called party answers during the silent period, F is normal and D operates at once. The parties can now talk through the condensers shown in the line branches above and below relay A.

If the called party hangs up first, D releases and reverses the battery on the calling line back to normal.

If the calling party hangs up, A releases, which in turn causes B to release after a brief delay. Release of B restores the finder and connector, and E and N, releasing D if operated. Slow-to-release relay U is the last to restore and connects X to lead RS (100, 1.b7, 3.b5, S.b5, T.b12, U.b12, B.b17, C.b8, D.b17, L.b14, X.wo, rect., RS). If the called party has not hung up before, it will go on lockout when the release of the connection removes ground from its test wire T.

The calling party may hang up at any time during the progress of a call. If the call is abandoned after E has operated, but before the call is answered, slow-to-release relay U restores later than E and 1–5, so that E cannot lock over a locking circuit (K.b15, 2.ml, 3.m18, 4.m8, 5.m18, C.b12, S.b12, U.b2, E.m12, E.w0), provided for use on reverting calls.

In case the called line is busy (A.B.C.T.U.1..5 operated), C will release after dialling the party digit and connects E to test wire T of the called line (K.b15, 2.m1, 3.m18, 4.m8, 5.m18, C.b12. S.b12 U.m2, E.wi, T.m4, TC), but E does not operate because test wire T is either grounded by another call or has no battery on it, if the called line is on lockout. With E remaining normal, release of T opens the circuit of E to prevent its operation if the called line should become free, and applies busy tone from lead BT (60 tone pulses per minute) to the line (BT, R.b14, U.m18, C.b5, T.b17, E.b8 or S.m6, F.b15). The circuit of C is held open by U and 1–5 (K.b15, B.m4, TF, X.b12, L.b8, E.b2, C.wo, B.m17, U.b12, T.b12, 5.b5, 3.b5, 1.b7), so that further dial pulses, if received, have no effect.

When the calling party hangs up, A and then B release, and ground is applied briefly to test wire T of the called line (K.b15, B.b4, U.m5, TC) to test for reverting call. On normal calls, this ground has no effect and the connection is released in the normal manner.

On reverting call to a station on the same line (A.B.U.1..5 operated) test wires T of calling and called line are the same, so that the line tests busy. When the calling party hangs up and releases A and B, the reverting call test ground applied to test wire T of the called line (K.b15, B.b4, U.m5, TC), returns over the finder switch to finder lead TF.

This ground on TF locks the connector and 1–5, and holds the finder switch temporarily after B releases (K.b15, B.b4, U.m5, TC and to TF, U.m16, 250 ohms, LKF). It also connects E (K.b15, B.b4, U.m5, TC and to TF, X.b12, L.b8, A.b12, C.b2, B.b7, E.wo).

Slow-to-release relay U releases shortly after B and restores the finder switch. Before the release of the finder opens ground returning from the called line to lead TF, release of U connects another ground to lead TF (K.b15, 2.m1, 3.m18, 4.m8, 5.m18, C.b12, S.b12, U.b2, E.m12, E.m2, L.b8, X.b12, TF). This holds E, 1–5 and the connector. Ringing is then started by E, as already described.

When the call is answered, D operates and releases 1–5, which opens one ground on TF (K.b15, 2.m1, 3.m18, 4.m8, 5.m18, C.b12, S.b12, U.b2, E.m12, E.m2, L.b8, X.b12, TF), but the connection is held by another ground applied by D to TF (TF, X.b12, L.b8, D.m14, L.b16, U.b5, E.m14). D also connects battery through L to lead RVT (100, 1.b7, 3.b5, 5.b5, T.b12, U.b12, B.b17, C.b8, D.m17, L.wo, RVT). This starts a common trick tone circuit, and tick tone is connected by D from lead TD to the line (TD, K.b12, D.m11, .25MF, B.b14, 2MF), informing the answering party that it is a reverting call. A few seconds later the tick tone circuit applies direct ground to lead RVT. This ground operates L (100, 1.b7, 3.b5, 5.b5, T.b12, U.b12, B.b17, C.b8, D.m17, L.wo, RVT), which opens the ground on lead TF (TF, X.b12, L.b8, D.m14, L.b16, U.b5, E.m14) and thereby causes the connection to release. The line is put on lockout and receives talking battery through the line circuit.

Should the answering party hang up before L is operated from the tick tone circuit, D releases, removes ground from lead TF (TF, X.b12, L.b8, D.m14, L.b16, U.b5, E.m14) and thereby releases the connection.

Incoming calls from trunks terminated on lines are handled just like local calls, except that the time disconnect feature, if used, which will presently be described, is disabled. On outgoing calls to this type of trunk, dialling the prefix assigned to the trunk group causes the link and marker to function as described in connection with dialling the prefix digit, except that the marker directs the connector switch to select an idle trunk and applies ground to lead LD instead of HS. To select the trunk, the marker operates a trunk control relay which applies ground to lead AC and in the connector-allotter bank to a tens bar and a units bar corresponding to an idle trunk. Ground on AC operates AR in the connector switch and thereby the connector tens coil and units coil required to select the chosen trunk.

This ground on LD operates L which is held temporarily by B (K.b15, B.m1, L.m16, L.m18, L.wi, TC, U.b5, L.m18, L.wi and L.m16, 250 ohms, LKF). Operation of L applies ground to lead TF; releases 1–5 (K.b15, B.m4, TF, X.b12, L.b8, D.b14, H.m12, lock, 1–5) and R (K.b15, B.m4, TF, X.b12, L.b8, F.b18, H.m14 or R.m16, R.wo); keeps the circuit of X open (100, 1.b7, 3.b5, 5.b5, T.b12, U.b12, B.b17, C.b8, D.b17, L.b14, X.wo, rect., RS); disconnects the calling line from A and cuts it through to the connector switch. This operates relays in the trunk, which return ground through the connector switch to lead TC, thereby holding L and the finder switch (K.b15, B.m1, L.m16, L.m18, L.wi, TC, U.b5, L.m18, L.wi and L.m16, 250 ohms, LKF). Release of the marker and of 1–5 restores G and H. After B releases following A ground placed by L on lead TF holds the connector switch over lead LKC and the cut-off relay of the calling line over the finder.

The connection is released when the trunk removes ground from lead TC, which releases L and the finder and connector switches.

Incoming calls from a trunk terminated on a switch are completed through this switch. On outgoing calls to this type of trunk, dialling the prefix assigned to the trunk group causes the marker to operate a trunk control relay.

Unless the trunks are all busy, the trunk control relay applies direct ground over lead RF to the locking contacts of the operated tens coil and units coil in the finder switch and operates the finder-allotter coil over lead AF to connect these two grounds to the finder-allotter bank.

The trunk control relay also operates a common allotter switch, to connect the finder-allotter bank to the connector-allotter bank, and the allotter coil of an idle trunk. The trunk allotter coil connects the tens and units coils of the trunk switch to the connector-allotter bank and thereby causes the locking grounds of the two operated finder coils to operate the same two coils in the trunk switch. This connects the calling line to the trunk.

The trunk then returns ground through the marker to lead LD. This ground operates L and releases the marker. L is held temporarily by B (K.b15, B.m1, L.m16, L.m18, L.wi, TC, U.b5, L.m18, L.wi and L.m16, 250 ohms, LKF); releases 1–5 (K.b15, B.m4, TF, X.b12, L.b8, D.b14, H.m12, lock, 1–5); and R (K.b15, B.m4, TF, X.b12, L.b8, F.b18, H.m14 or R.m16, R.wo); and disconnects A from the calling line, releasing A and then B which restores the link to normal since no selection has been made in the connector switch which could hold L over lead TC. The link is now free and the trunk call is completed by the trunk switch.

An overflow signal is given, if all trunks in the called group are busy. The trunk control relay applies ground through the marker to lead MR, which operates U. Relay U locks (K.b15, B.m4, TF, X.b12, L.b8, U.m14, B.m7, U.wo); applies overflow busy tone (120 tone pulses per minute) from lead OT to the line (OT, R.m14, U.m18, C.b5, T.b17, E.b8, F.b15); and releases G, H (K.b15, 2.m1, 3.m18, 4.m8, 5.m18, C.b12, S.b12, U.b2, E.b12, H.wi, G.w, rect., GS) and the marker. Release of H restores 1–5 (K.b15, B.m4, TF, X.b12, L.b8, D.b14, H.m12, lock, 1–5), and U prevents re-operation of C (K.b15, B.m4, TF, X.b12, L.b8, E.b2, C.wo, B.m17, U.b12, T.b12, 5.b5, 3.b5, 1.b7), so that further dial pulses, if received, have no effect. When the calling party hangs up, A and B release and restore the link. If an unassigned prefix number is dialled, the marker also applies ground to lead MR and causes the functions described above.

When several links try to seize the marker at the same time, the marker will serve one link after the other and reach the last waiting link after a slight delay. In an exceptional case, extremely fast dialling on this link may start the pulses for the next digit before the selection is completed and C re-operated. On a prefix selection the first pulse then will operate U (K.b15, B.m4, TF, X.b12, L.b8, A.b12, C.b2, B.m7, U.wo) which locks and gives busy tone (BT, R.b14, U.m18, C.b5, T.b17, E.b8 or S.m6, F.b15) or overflow tone (OT, R.m14, U.m18, C.b5, T.b17, E.b8, F.b15) if R is already operated. On a tens selection the first pulse will operate U and, with T being operated, release S together with 1-5 when H restores. This skips the units selection which keeps test wire T open, prevents operation of E, and gives busy tone. On a units selection a pulse or two of the party digit may be suppressed.

False preliminary pulses are absorbed as follows: Dialling prefix 1 normally causes the marker to release without operating the connector switch or applying ground to any of the marker leads. Release of the marker opens battery on lead GI, thereby releasing G and H. This in turn releases 1-5 (K.b15, B.m4, TF, X.b12, L.b8, D.b14, H.m12, lock, 1-5) and lets C operate (K.b15, B.m4, TF, X.b12, L.b8, E.b2, C.wo, B.m17, U.b12, T.b12, 5.b5, 3.b5, 1.b7) while R is held (K.b15, B.m4, TF, X.b12, L.b8, F.b18, H.m14 or R.m16, R.wo). With R operated dial tone is disconnected (DT, R.b12, C.m5, T.b17, E.b8, F.b15), but otherwise the link is ready to receive another prefix.

The marker may be cross-connected as previously explained, to perform the same functions on dialling other prefix numbers. This makes it possible to absorb certain prefix numbers where universal directory numbering is used in an area.

Unless a call is answered within a predetermined time interval, the link will be released and the calling party placed on lockout by a lockout timing circuit. This circuit transmits a ground pulse every three minutes over lead LS, which operates K briefly.

As long as the link is idle, K cannot lock, but when the link is engaged, K locks (K.b15, B.m4, TF, X.b12, L.b8, D.b14, H.b12, K.m1, K.wi) to ground on lead TF which is present either on a regular call or on a reverting call. Operation of H after the first three digits releases K, if operated, to re-start the timing interval. With K operated, ground through K.b15 is open, but the link is supplied with another ground over lead LT from the lockout timing circuit. When the call is answered, D opens the locking circuit of K (K.b15, B.m4, TF, X.b12, L.b8, D.b14, H.b12, K.m1, K.wi), releasing K if operated at the time. After the called party hangs up, D is normal and again permits K to lock.

This means that K can lock at any time during the progress of a call, except while D is operated by the called party. If K locks after operating from a pulse on lead LS and is not released by D within three minutes, the lockout timing circuit interrupts ground on lead LT. This releases the connection and puts the calling line on lockout. On calls to trunks terminated on lines L opens the locking circuit of K (K.b15, B.m4, TF, X.b12, L.b8, D.b14, H.b12, K.m1, K.wi) and thereby prevents lockout.

Where time disconnect of local calls is used, answering the call operates D which releases K if operated. This prepares a circuit from time disconnect lead TD to relay R (TD, K.b12, D.m11, rect., K.b4, R.wo). Ground pulses are transmitted over lead TD at three-minute intervals immediately following the pulses on lead LS.

After the call is answered, the next pulse received over lead TD operates R which locks (K.b15, B.m4, TF, X.b12, L.b8, F.b18, H.m14 or R.m16, R.wo) and prepares a new locking circuit for K (K.b15, B.m4, TF, X.b12, L.b8, R.m8, H.b12, K.m1, K.wi). A rectifier blocks the locking ground of R from lead TD. Three minutes later the next pulse on lead LS operates K which can now lock. With K remaining operated, the connection is released after another three minutes, as explained in connection with placing the called party on lockout, giving the subscribers not less than six minutes for a call.

With D and K operated, S is connected to lead WT (WT, K.m12, D.m11, rect., K.m4, S.wo). The lockout timing circuit transmits a ground pulse over lead WT twenty seconds and again a few seconds before each interruption of ground on lead LT. These pulses operate S for a second or so. S applies overflow busy tone from lead OT to the line (OT, R.m14, U.m18, C.b5, T.b17, E.b8, F.b15) as a warning that the call will shortly be disconnected.

On outgoing calls to trunks terminated on lines L prevents disconnect as explained in connection with placing the called party on lockout. Incoming calls from trunks terminated on lines use the links in the same manner as local calls, permitting R, K and S to operate on the timing pulses. However, ground furnished by the trunk over finder lead TF is connected by B to LT, preventing time disconnect on trunk calls, although the warning tone will be heard. Lead TD is not connected to the timing circuit, if time disconnect is not required.

The designation "automatic telephone system," as used in the appended claims, is intended to embrace other signalling systems, except where limited by specific restrictions. The term "relay system" or "relay switch," or similar language, used in the appended claims, is intended to embrace, with sensible latitude, systems and switches of the crossbar or coordinate type. The term "subscriber's line" is intended to apply to a trunk line connecting with a link circuit; and, similarly, the term "called subscriber's line" or "connector" is intended to embrace trunk lines or trunk switches, respectively.

I claim:

1. In an automatic telephone system of the relay type, a universal relay link circuit adapted for operative coaction with connector switches in a 100-line system or with selector switches in a selector system, respectively, said link circuit comprising circuit-switching and control means for governing the setting up of connections over said connector or over said selector, respectively, and for maintaining such connections and for causing release thereof, said circuit switching and control means including relay means for governing the selection of called subscribers, signalling and supervisory control means, ringing and ring-selection means, timing control means, and battery-feed control means for the calling and for the called lines.

2. The system defined in claim 1, wherein said relay means for governing the selection of called subscribers comprises counting relays for receiving dial pulses from a calling subscriber's line, a marker circuit, means for temporarily connecting said marker circuit with said link circuit for coaction therewith in the setting up of connections, a set of marker relays in said marker circuit, a pair of conductors extending from said marker relays, means for extending said pair of conductors to said link circuit upon connection thereof with said marker circuit, contact means controlled by said counting relays for variably setting said marker relays over said pair of conductors in accordance with the digits of the called subscriber's number, and circuit means controlled by said marker circuit for causing said link circuit to set up the corresponding connections.

3. The system defined in claim 2, wherein said counting relays consist of five relays and wherein said marker relays consist of seven relays.

4. The link circuit as defined in claim 1 for operative coaction especially with a selector switch in a selector type system, comprising a group of connectors accessible to said selector switch, the number of relays in each of said connectors consisting of four relays, and circuit means controlled by said four relays for governing the extension of a call to a called subscriber's line.

5. The link circuit as defined in claim 1 for operative coaction especially with a selector switch in a selector type system, comprising a group of connectors accessible to said selector switch, the number of relays in each of said connectors consisting of four relays, circuit means controlled by said four relays for governing the extension of a call to a called subscriber's line, and a marker circuit common to all connectors, and means controlled by said link circuit for governing the operation of said marker circuit to control the operation of a connector to extend calls to called lines.

6. The link circuit as defined in claim 1 for operative coaction especially with a selector switch in a selector type system, comprising a selector marker common to one hundred lines, means for temporarily connecting said link circuit with said marker in setting up a call, tens and units selector control means common to a plurality of link circuits, coacting with selector switches, said relay means for governing the selection of called lines comprising counting relays, means for directing to said counting relays dial pulses originating at a calling subscriber's line, marker relays in said selector control means, a pair of conductors, relay means for extending said pair of conductors to interconnect said link circuit with said marker relays, contact means controlled by said counting relays responsive to said dial pulses for variably setting said marker relays over said pair of conductors in accordance with digits of the called subscriber's line, and circuit means controlled by said marker relays for governing the extension of a call to one of a plurality of connectors.

7. The link circuit as defined in claim 1 for operative coaction especially with a selector switch in a selector type system, comprising a selector marker common to one hundred lines, means for temporarily interconnecting said link circuit with said marker in setting up a call, tens and units selector control means common to a plurality of link circuits, selector switches coacting with said tens and units selector control means, said relay means for governing the selection of called lines comprising counting relays, means for directing to said counting relays dial pulses originating at a calling subscriber's line, marker relays in said selector marker, a pair of conductors, means for extending said pair of conductors to interconnect said link circuit with said marker relays, contact means controlled by said counting relays for variably setting said marker relays over said pair of conductors in accordance with digits of the called subscriber's line, circuit means controlled by said marker relays for governing said tens and units selector control means to control the extension of a call to one of a plurality of connectors, each of said connectors having a set of control relays consisting solely of four relays, and circuits controlled by said four relays for governing the extension of a call to called lines.

8. The link circuit as defined in claim 1 for operative coaction especially with a selector switch in a selector type system, comprising a selector marker common to one hundred lines, means for temporarily connecting said link circuit with said marker in setting up a call, tens and units selector control means common to a plurality of link circuits, said relay means for governing the selection of called subscribers comprising counting relays, means for directing to said counting relays dial pulses originating at a calling subscriber's line, marker relays in said selector marker, a pair of conductors, means for extending said pair of conductors to interconnect said link circuit with said marker relays, contact means controlled by said counting relays for variably setting said marker relays over said pair of conductors in accordance with digits of the called subscriber's line, a plurality of connectors, circuit means controlled by said marker relays for governing said tens and units selector control means to extend a call to one of said plurality of connectors having a set of relays, each of said connectors consisting of four relay circuit means controlled solely by said four relays for governing the extension of a call to a called line, and a marker circuit common to all connectors, and means in said link circuit for operating said last named marker to control the operation of said connector for extending said call to the called line.

9. The link circuit defined in claim 1 for operative coaction especially with a connector switch in a 100-line system, comprising a marker circuit which is common to a plurality of said link circuits, means for temporarily connecting with said marker circuit a link circuit involved in setting up a call, a group of marker relays in said marker circuit, a pair of conductors, means responsive to the connection of said link circuit with a marker for extending said pair of conductors between such marker and such link circuit, counting relays in said link circuit responsive to dial pulses received from a calling subscriber's line, contact means operated by said counting relays for transmitting variable combinations of control pulses to said marker relays over said pair of conductors for variably setting said marker relays, and circuit means controlled by said marker relays for causing said link circuit to operate said connector to extend the call to the corresponding called subscriber's line.

10. The link circuit defined in claim 1 for operative coaction especially with a connector switch in a 100-line system, comprising a marker circuit which is common to a plurality of link circuits, means for temporarily connecting with said marker circuit a link circuit involved in setting up a connection, a group of marker relays in said marker circuit consisting of seven relays, a pair of conductors, means responsive to the connection of said link circuit with said marker circuit for extending said pair of conductors between said link and said marker relays, a group of counting relays in said link circuit consisting of five counting relays which are responsive to dial pulses received from a calling subscriber's line, contact means operated by said counting relays for transmitting variable combinations of control pulses to said marker relays over said pair of conductors for variably setting said marker relays, and circuit means controlled by said marker relays for causing said link circuit to operate said connector to extend the connection to the corresponding called subscriber's line.

11. The link circuit defined in claim 1, which is one of a plurality of like link circuits in a system wherein each subscriber's line has a line circuit comprising a line relay and a cutoff relay and wherein each link circuit has a finder switch individual thereto for connecting it with a calling line, comprising a tens and units guard means common to a plurality of links, means in said guard means for preventing interference between simultaneously occurring calls, said guard means comprising tens and units guard chain relays, circuits for said guard chain relays controlled over contacts of said line and cutoff relays of a calling line, control relay means, and circuit means controlled by said guard chain relays and said control relay means for marking a calling line in the finder switch of an idle link circuit.

12. The circuit combination defined in claim 11, comprising distributor means in said tens and units guard means for identifying faulty lines attempting to establish connections and for setting and guard chains to permit other calls to land on idle links.

13. The circuit combination defined in claim 11, comprising distributor means in said tens and units guard means, said distributor means being operative to set said guard chains responsive to fault conditions occurring respectively in the line circuits of calling lines or in a link on incoming calls or in portions of said guard chains to maintain service for operative calling lines.

14. The circuit combination defined in claim 11, comprising rectifier means in said guard chain means controlled by the line relays and cutoff relays of calling lines, and rectifier means in said tens guard chain relays and units guard chain relays for preventing interference between such guard chain relays.

15. The circuit combination defined in claim 11, comprising a control relay in said guard circuits, means in idle links for supplying a potential to maintain said control relay operated, said control relay releasing after operative actuation of all links, and a reset circuit thereupon operative for preparing links that have become idle to except calls.

16. The link relay circuit defined in claim 1, which is one of a plurality of like link circuits each coacting with a connector switch in a 100-line system, comprising a marker circuit which is common to a plurality of link circuits, means for causing temporary seizure of a marker circuit by a link involved in setting up a call, for operative coaction therewith for the duration of the corresponding selection operation, and a guard chain circuit in said link for assuring individual seizure of said marker circuit by a link to the exclusion of other links.

17. The link relay circuit defined in claim 1, which is one of a plurality of like link circuits each coacting with a connector switch in a 100-line system, comprising a marker circuit which is common to a plurality of link circuits, means for causing temporary seizure of a marker circuit by a link involved in setting up a call, for operative coaction therewith for the duration of the corresponding selection operation, and a guard chain circuit in said link for assuring individual seizure of said marker circuit to the exclusion of other links, said guard chain circuit comprising a plurality of sections, one for a group of links, to prevent fault conditions occurring in one link group from affecting operation of another operative link group.

18. The link relay circuit defined in claim 1, which is one of a plurality of like link circuits each coacting with a selector switch in a selector type system, comprising a marker circuit which is common to a plurality of such link circuits, means for causing a link involved in setting up a call to effect temporary seizure of a marker circuit, for operative coaction therewith for the duration of the selection operation required to set up said call, and a guard circuit in said link for assuring individual seizure of said marker circuit to the exclusion of other links.

19. The link relay circuit defined in claim 1, which is one of a plurality of like link circuits each coacting with a selector switch in a selector type system, comprising a marker circuit which is common to a plurality of such link circuits, means for causing a link involved in setting up a call to effect temporary seizure of said marker circuit, for operative coaction therewith for the duration of the corresponding selection operation, and a guard circuit in said link for assuring individual seizure of the marker circuit to the exclusion of other links, said guard circuit comprising a plurality of sections, each for a different group of links, to prevent fault conditions occurring in one link group from affecting the operation of links in another operative link group.

20. The link circuit defined in claim 1, comprising a marker circuit, means for causing said link circuit when involved in setting up a call to effect seizure of said marker circuit, for coaction therewith in executing selection operations required in setting up said call, and means for releasing said marker circuit after a predetermined interval to prevent blocking thereof by an incomplete call.

21. A counting relay chain for use in a signalling system having an impulse-receiving relay and means for directing thereto series impulses each series not exceeding ten impulses, said chain comprising a first, a second, a third, a fourth and a fifth counting relay, circuit means for said counting relays, said first counting relay being operatively responsive only to the successive odd number pulses of said pulse-receiving relay, said second counting relay being operatively responsive only for parts of the successive even number pulses of said pulse-receiving relay and for the intervals between the successive pulses, said third counting relay being operatively responsive only subsequent to the second and eighth pulse and holding to the conclusion of the fifth and tenth pulse, respectively, said fourth counting relay being responsive coincident with the initiation of the fourth pulse and releasing coincident with the initiation of the seventh pulse of said pulse-receiving relay, and said fifth counting relay being operatively responsive only after the conclusion of the sixth pulse of said pulse-receiving relay and holding subsequent to the tenth pulse thereof, a utilizing circuit, a circuit path extending from said counting relays to said utilizing circuit, said circuit path consisting solely of two conductors, means for extending said conductors to interconnect said utilizing circuit with said counting relays, contacts operated by said counting relays for connecting predetermined potentials over two conductors to said utilizing circuit, an output circuit in said utilizing circuit having ten conductors, and a group of marker relays in said utilizing circuit responsive in predetermined combination to said potentials for marking said conductors in accordance with the digits received by said impulse relay.

22. The system defined in claim 21, wherein said group of marker relays consists of seven relays.

References Cited in the file of this patent

UNITED STATES PATENTS

| | | |
|---|---|---|
| 2,389,275 | Rayner | Nov. 20, 1945 |
| 2,568,101 | Voss | Sept. 18, 1951 |
| 2,606,236 | Oberman | Aug. 5, 1952 |